United States Patent
Yamashita et al.

(10) Patent No.: US 10,148,166 B2
(45) Date of Patent: Dec. 4, 2018

(54) POWER CONVERTER AND VEHICLE DRIVING SYSTEM

(71) Applicant: Mitsubishi Electric Corporation, Chiyoda-ku, Tokyo (JP)

(72) Inventors: Yoshinori Yamashita, Tokyo (JP); Sho Kato, Tokyo (JP); Hisanori Yamasaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 107 days.

(21) Appl. No.: 15/506,087

(22) PCT Filed: Aug. 28, 2014

(86) PCT No.: PCT/JP2014/072659
§ 371 (c)(1),
(2) Date: Feb. 23, 2017

(87) PCT Pub. No.: WO2016/031030
PCT Pub. Date: Mar. 3, 2016

(65) Prior Publication Data
US 2018/0219469 A1 Aug. 2, 2018

(51) Int. Cl.
*H02P 6/14* (2016.01)
*H02M 1/14* (2006.01)
(Continued)

(52) U.S. Cl.
CPC ......... *H02M 1/14* (2013.01); *H02M 7/53871* (2013.01); *H02P 27/08* (2013.01)

(58) Field of Classification Search
USPC ................ 318/438, 722, 606, 400.17, 400.2
See application file for complete search history.

(56) References Cited

U.S. PATENT DOCUMENTS

| 5,680,299 A | 10/1997 | Yasuda et al. |
| 2010/0219780 A1 | 9/2010 | Morimoto et al. |

(Continued)

FOREIGN PATENT DOCUMENTS

| JP | 05-316735 A | 11/1993 |
| JP | 07-227085 A | 8/1995 |

(Continued)

OTHER PUBLICATIONS

Office Action (Notification of Reason for Refusal) dated Oct. 25, 2016, by the Japanese Patent Office in corresponding Japanese Patent Application No. 2015-226545 and partial English translation of the Office Action. (10 pages).

(Continued)

*Primary Examiner* — Eduardo Colon Santana
*Assistant Examiner* — Iftekhar Mustafa
(74) *Attorney, Agent, or Firm* — Buchanan Ingersoll & Rooney PC

(57) ABSTRACT

A power converter includes a control unit that generates a modulated wave synchronized with an output voltage command and a carrier wave having a frequency higher than a frequency of the modulated wave, the control unit controlling the power converter by comparing the modulated wave and the carrier wave to output a switching signal for driving a switching element. When a modulation factor in converting DC power into AC power is equal to or higher than a mode switching modulation factor and is lower than $\pi/4$, the power converter converts the DC power into the AC power in an over-modulation mode, in which switching of the switching element is stopped for a period longer than one cycle of the carrier wave, in a first period in which an output voltage command is positive and timing of a positive peak value of the output voltage command is included.

20 Claims, 13 Drawing Sheets

(51) Int. Cl.
    *H02M 7/5387*    (2007.01)
    *H02P 27/08*     (2006.01)

(56)          References Cited

U.S. PATENT DOCUMENTS

2011/0273125 A1*  11/2011  Yamada .............. H02P 21/0003
                                                        318/503
2014/0232318 A1    8/2014  Yokozutsumi et al.
2015/0015171 A1*   1/2015  Nishibata ............ H02P 29/0038
                                                       318/400.15
2015/0357988 A1   12/2015  Yokozutsumi et al.
2016/0233801 A1*   8/2016  Sakai .................. H02M 7/5395
2016/0352269 A1*  12/2016  Takahashi .............. H02P 27/085

FOREIGN PATENT DOCUMENTS

JP      2005-348597 A    12/2005
JP      2014-128066 A     7/2014
WO      2009/063786 A1    5/2009
WO      2012/081493 A1    6/2012
WO      2013/046462 A1    4/2013
WO      2014/122736 A1    8/2014

OTHER PUBLICATIONS

Sugimoto, "Theory of an AC Servo System and Actual Design", Sogo Denshi Shuppan Co., Ltd., 1990, (24 pages).

* cited by examiner

LOWER LIMIT MODULATION FACTOR=($\pi/4$)
×(1−MINIMUM PULSE WIDTH×CARRIER WAVE FREQUENCY×2)

POWER CONVERTER AND VEHICLE DRIVING SYSTEM

FIELD

The present invention relates to a power converter that performs pulse width modulation (hereinafter referred to as "PWM") control.

BACKGROUND

There has been widely known a power converter that performs PWM control by comparing a modulated wave synchronized with an AC output voltage and a carrier wave consisting of a triangular wave, a saw-tooth wave, or the like and having a frequency higher than the frequency of the modulated wave. For example, Non Patent Literature 1 described below discloses a general technology concerning the PWM control. The PWM control includes a synchronous PWM mode (hereinafter simply referred to as "synchronous mode") in which the modulated wave and the carrier wave are synchronized and an asynchronous PWM mode (hereinafter simply referred to as "asynchronous mode") in which the carrier wave frequency is increased and control is performed without synchronizing the modulated wave and the carrier wave. For example, in a power converter for motor driving, it is widely known that, while an output voltage is increased as an output frequency increases, the power converter is shifted from the asynchronous mode to the synchronous mode and operated according to the increase in the output frequency.

Patent Literature 1 described below discloses a technology for gradually increasing the amplitude of a modulated wave according to an output voltage command value and, when a modulation factor at which the maximum amplitude of the modulated wave coincides with the maximum value of a carrier wave reaches $\pi/4$, shifting to an over-modulation mode in which a value of the modulated wave is always set larger than a value of the carrier wave for a period longer than one cycle of the carrier wave to stop switching. According to the technology of the patent literature, because the over-modulation mode is applied when the modulation factor is equal to or higher than $\pi/4$, it is possible to suppress occurrence of a narrow width pulse (hereinafter referred to as "narrow pulse") around a peak value of an output voltage command in a state in which the modulation factor is equal to or higher than $\pi/4$.

CITATION LIST

Patent Literature

Patent Literature 1: Japanese Patent Application Laid-Open No. H7-227085

Non Patent Literature

Non Patent Literature 1: Hidehiko Sugimoto "Theory of an AC Servo System and Actual Design" Sogo Denshi Shuppan Co., Ltd. 1990

SUMMARY

Technical Problem

However, in the conventional technology, there is a problem in that, when the carrier wave frequency is particularly high, the narrow pulse sometimes occurs even when the modulation factor is lower than $\pi/4$ and it is likely that vibration occurs in a voltage applied to a load by the power converter (hereinafter referred to as "AC output voltage" or simply referred to as "output voltage") because of the occurrence of the narrow pulse and induction failures occur.

The present invention has been devised in view of the above and it is an object of the present invention to obtain a power converter and a vehicle driving system that can suppress occurrence of a narrow pulse irrespective of the level of a carrier frequency and suppress occurrence of induction failures.

Solution to Problem

To solve the above problem and achieve an object, an aspect of the present invention includes a power converting unit including a switching element, the power converting unit converting DC power into AC power; and a control unit including a modulated-wave generating unit to generate a modulated wave synchronized with an output voltage command of the power converting unit and a carrier-wave generating unit to output a carrier wave having a frequency higher than a frequency of the modulated wave, the control unit controlling the power converting unit by comparing the modulated wave and the carrier wave to output a switching signal for driving the switching element, wherein when a modulation factor in converting the DC power into the AC power is equal to or higher than a mode switching modulation factor and is lower than $\pi/4$, the power converting unit converts the DC power into the AC power in an over-modulation mode, in which switching of the switching element is stopped for a period longer than one cycle of the carrier wave, in a first period in which an output voltage command is positive and timing of a positive peak value of the output voltage command is included.

Advantageous Effects of Invention

According to the present invention, there is an effect that, because the power converting unit performs the power conversion in the over-modulation mode in the first period that is the period in which the output voltage command is positive from the point in time when the modulation factor is lower than $\pi/4$, the first period including the timing of the positive peak value of the output voltage command, it is possible to suppress occurrence of a narrow pulse irrespective of the level of a carrier frequency and suppress occurrence of induction failures.

DESCRIPTION OF EMBODIMENTS

Power converters according to embodiments of the present invention are explained below with reference to the accompanying drawings. Note that the present invention is not limited by the embodiments explained below.

First Embodiment

Figure 1:
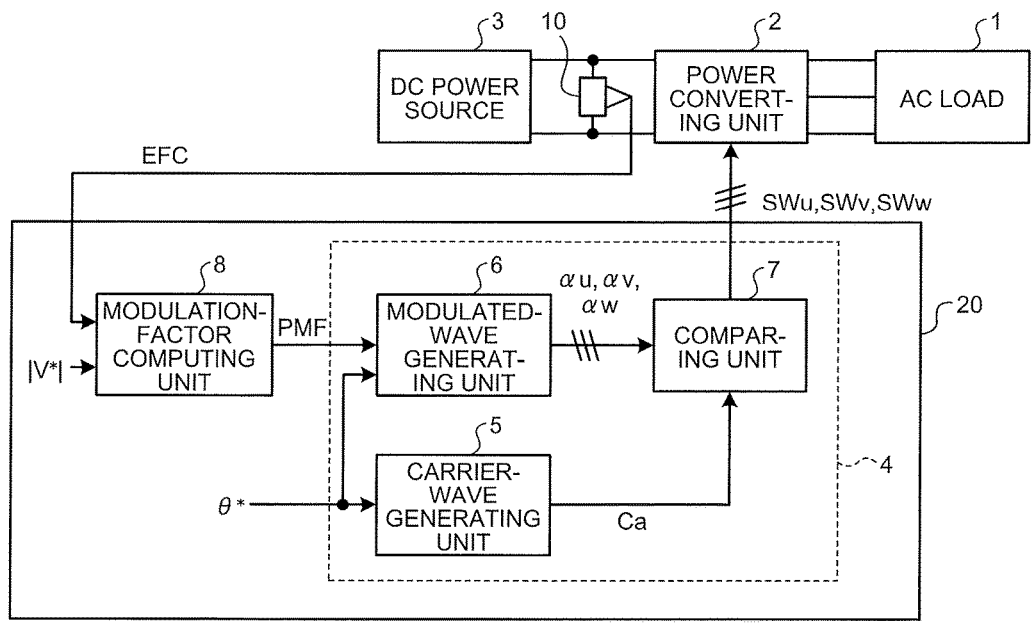
FIG. 1 is a diagram showing the configuration of a power converter according to a first embodiment.

FIG. 1 is a diagram showing the configuration of a power converter according to a first embodiment. As shown in the figure, the power converter in the first embodiment includes a power converting unit 2, a DC power source 3, a control unit 20, and a voltage detecting unit 10 as components for driving an AC load 1, which is, for example, an AC motor. The control unit 20 includes a switching-signal generating unit 4 and a modulation-factor computing unit 8. The switching-signal generating unit 4 includes a carrier-wave generating unit 5, a modulated-wave generating unit 6, and a comparing unit 7. Note that, in FIG. 1, the switching-signal generating unit 4 is configured to include the carrier-wave generating unit 5 and the modulated-wave generating unit 6. However, the carrier-wave generating unit 5 and the modulated-wave generating unit 6 can be provided on the outside of the switching-signal generating unit 4. One power converter is configured by combining the power converting unit 2 and the control unit 20.

The power converting unit 2 has a function of converting DC power supplied from the DC power source 3 into AC power and supplying the AC power to the AC load 1. For modulation factor computation explained below, the power detecting unit 10 detects a DC voltage EFC output to an input side (a DC power source side: the left side in FIG. 1) of the power converting unit 2 from the DC power source 3 and outputs the DC voltage EFC to the modulation-factor computing unit 8.

Figure 2:
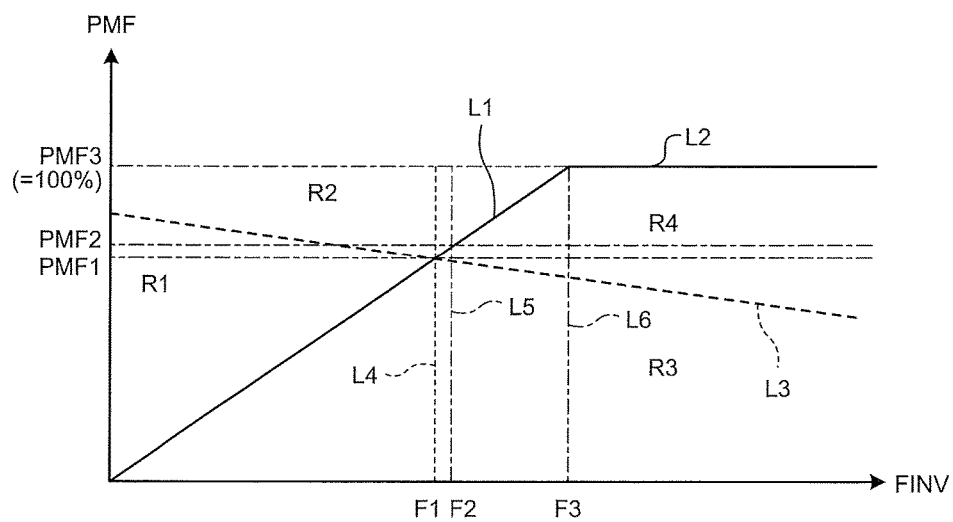
FIG. 2 is a diagram showing a relation between a modulation factor and an output frequency of the power converter according to the first embodiment.

FIG. 2 is a diagram for explaining transition conditions of a modulation mode in the power converter in this embodiment, and is a graph showing a relation between a frequency FINV (hereinafter referred to as "output frequency") of AC power output to the AC load 1 from the power converting unit 2 and a modulation factor PMF. The modulation factor PMF is determined by an output voltage output to the AC load 1 and a voltage EFC (hereinafter referred to as "DC voltage") of the DC power supplied from the DC power source 3.

In FIG. 2, a straight line L1 indicated by a solid line is an example of a typical control curve at the time when the power converter is controlled. A straight line L2 indicated by a solid line is a control curve by a synchronous one pulse (1P) mode. A straight line L3 indicated by a broken line is a lower limit modulation factor. All of the straight lines are represented as functions of the output voltage frequency FINV. A straight line L4 indicated by a broken line is a first mode switching frequency F1 for performing switching of the modulation mode in this embodiment. A straight line L5 indicated by an alternate long and short dash line is a second mode switching frequency F2 for performing switching of the modulation mode in this embodiment. A straight line L6 indicated by an alternate long and short dash line is a third mode switching frequency F3 for performing switching of the modulation mode in this embodiment.

Note that, in FIG. 2, the modulation factor PMF at an intersection of the straight line L1 and the straight line L3 (or L4) is represented as a first mode switching modulation factor PMF1, the modulation factor PMF at an intersection of the straight line L1 and the straight line L5 is represented as a second mode switching modulation factor PMF2, and the modulation factor PMF at an intersection of the straight line L1 and the straight line L2 is represented as a third mode switching modulation factor PMF3.

In this embodiment, the straight line L3 is a boundary line indicating, for each of frequencies, a modulation factor lower limit value in applying an over-modulation mode explained below. The first mode switching frequency F3 is a boundary line between an asynchronous mode and a synchronous mode. As shown in FIG. 2, an operation region of the power converter according to this embodiment is divided into four regions by the straight lines L3 and L4, a horizontal axis, and a vertical axis as explained below.

(2.1) Asynchronous Modulation PWM Region (Region R1)

A region surrounded by the horizontal axis, the vertical axis, L3, and L4. The power converter is controlled by the asynchronous mode in which an asynchronous carrier wave is used.

(2.2) Asynchronous Over-Modulation PWM Region (Region R2)

A region surrounded by the vertical axis, L3, and L4. A non-operating region in which the power converter is controlled not to operate due to deviation to the region.

(2.3) Synchronous Modulation PWM Region (Region R3)

A region surrounded by the horizontal axis, L3, and L4. A region in which the power converter operates in restart and notch-off.

(2.4) Synchronous Modulation PWM Region (Region R4)

A region surrounded by L3 and L4. Modulated PWM control using a synchronous carrier wave is performed.

The power converting unit 2 basically outputs AC power along the straight lines L1 and L2. Therefore, the power converting unit 2 basically controls the AC power in the region R1 and the region R4. However, in the case of notch-off for performing an operation stop when an AC load is changed to a coasting state and in the case of a restart for performing a start in the coasting state of the AC load, the power converter operates below the straight lines L1 and L2. Therefore, when the restart and the notch-off are performed in a state in which an output frequency is in a high-speed region, the AC power may be controlled even in the region R3. On the other hand, because the AC power does not deviate exceeding the straight lines L1 and L2, the AC power is not controlled in the region R2. In the following description, explanation is omitted concerning the control of the AC power in the cases of the restart and the notch-off. Therefore, power conversion control in the regions R1 and R4 is explained.

Up to the modulation factor PMF 100%, which is a limit of the output voltage, power conversion is performed according to a control system called variable voltage variable frequency (VVVF) control. The power converting unit 2 outputs the AC power such that the output frequency FINV and the output voltage (or the modulation factor PMF) increase while keeping a fixed ratio. On the other hand, after the modulation factor PMF reaches a limit value 100%, power conversion is performed according to a control system called constant voltage variable frequency (CVVF) control. The power converting unit 2 outputs the AC power such that the output frequency increases while the output voltage is fixed.

A state in which the modulation factor PMF is 100% is defined so that the modulation factor becomes a modulation factor during a synchronous one pulse mode (180° energization or rectangular wave driving) publicly known in this technical field (a definition of the modulation factor is separately explained below). In this embodiment, a form in which the CVVF control is performed in a state of the modulation factor 100% is explained. However, not only this, but the CVVF control can be carried out at any modulation factor PMF or a ratio of the output frequency FINV and the output voltage (or the modulation factor PMF) can be adjusted and the VVVF control can be carried out in all regions in which the AC load operates.

In FIG. 2, as the output frequency FINV and the modulation factor PMF increase, the modulation mode of the power converting unit 2 is switched to the asynchronous mode, the synchronous multi-pulse mode (in this embodiment, a synchronous 27 pulse mode is illustrated), the over-modulation synchronous mode, and the synchronous one pulse mode. More specifically, when the output frequency FINV is lower than F1, that is, the modulation factor PMF is lower than PMF1, the power converter operates in the asynchronous mode. When the output frequency FINV is equal to or higher than F1 and lower than F2, that is, when the modulation factor PWM PMF is equal to or higher than PMF1 and lower than PMF2, the power converter operates in the synchronous multi-pulse mode. When the output frequency FINV is equal to or higher than F2 and lower than F3, that is, when the modulation factor PWM PMF is equal to or higher than PMF2 and lower than PMF3, the power converter operates in the over-modulation PWM mode. When the output frequency FINV is equal to or higher than F3, that is, when the modulation factor PWM PMF is equal to or higher than PMF3, the power converter operates in the synchronous one pulse mode. When PWM 2 for determining a start of the over-modulation synchronous mode is set to a ratio equal to or lower than $\pi/4$, the over-modulation synchronous mode is started from a point in time when the modulation factor PMF is lower than $\pi/4$. Concerning the asynchronous mode and the synchronous one pulse mode, a publicly-known control method disclosed in Non Patent Literature 1 explained above and the like only has to be applied. Note that the over-modulation mode is a modulation mode for stopping, in a period including timing of a maximum or a minimum of the AC output voltage, switching for a period longer than one cycle of a carrier wave determined by a carrier wave frequency. The over-modulation synchronous mode is a modulation mode in which a carrier wave and a modulated wave are synchronized in the over-modulation mode.

Figure 3:
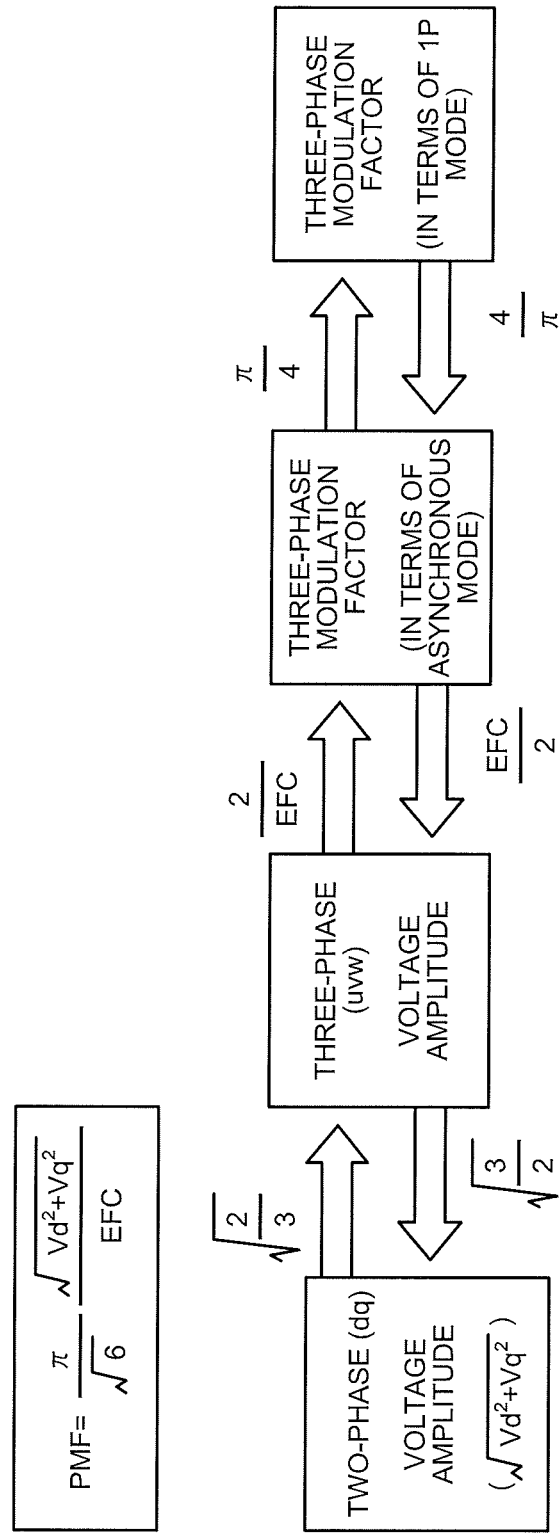
FIG. 3 is a diagram for explaining a definition of a modulation factor PMF in this specification.

Note that there are various ways of defining the modulation factor PMF. A definition of the modulation factor PMF in this specification is clarified. FIG. 3 is a diagram for explaining the definition of the modulation factor PMF in this specification.

When the AC load 1 is driven by the power converting unit 2, vector control for dividing an electric current flowing out from and flowing into the AC load 1 into an excitation current (a d-axis current) and a torque current (a q-axis current) and individually controlling the excitation current and the torque current is often performed. When the vector control is performed, an excitation voltage (a d-axis voltage) and a torque voltage (a q-axis voltage) are generated on the inside of the switching-signal generating unit 4. Therefore, in this specification, as indicated by Expression (1) described later, an output voltage command |V*| is represented by a square root of a square sum of a d-axis voltage Vd and a q-axis voltage Vq orthogonal to each other (hereinafter referred to as "two-phase dq voltage amplitude" as appropriate).

When the two-phase dq voltage amplitude is converted into a voltage value of a three-phase UVW coordinate system (hereinafter referred to as "three-phase uvw voltage amplitude" as appropriate), as shown in FIG. 3, the two-phase dq voltage amplitude is multiplied with $\sqrt{(2/3)}$, which is a conversion coefficient by the coordinate conversion. In the following explanation, as shown in the figure, when the three-phase uvw voltage amplitude is converted into a three-phase modulation factor in terms of the asynchronous mode, the three-phase uvw voltage amplitude is multiplied with (2/EFC), which is a conversion coefficient. When the three-phase modulation factor of the asynchronous conversion is converted into a three-phase modulation factor in terms of the one pulse (1P) mode, the three-phase modulation factor is multiplied with ($\pi/4$). The 1P conversion means that the modulation factor PMF during the one pulse mode (180° energization) publicly known in this technical field is set to "1".

Therefore, if $\sqrt{(Vd^2+Vq^2)}$, which is the two-phase dq voltage amplitude, is sequentially multiplied with these coefficients, a definitional equation of the modulation factor PMF indicated by the following expression is obtained.

$$PMF=\sqrt{(Vd^2+Vq^2)}\times\sqrt{(2/3)}\times(2/EFC)\times(\pi/4)=(\pi/\sqrt{(6)})\times\sqrt{(Vd^2+Vq^2)}/EFC$$

Note that, when the three-phase modulation factor of the 1P conversion is converted into the two-phase dq voltage amplitude, conversion processing from the right side to the left side only has to be performed according to the inverses of the conversion coefficients, that is, conversion coefficients shown on the lower side in the figure.

Referring back to FIG. 1, the power converting operation in the power converting unit 2 is performed by driving, according to switching signals SWu, SWv, and SWw generated by the switching-signal generating unit 4, a plurality of semiconductor switch elements configuring the power converting unit 2. Note that, concerning the configuration of the power converting unit 2, please refer to FIG. 15 referred to below.

The switching-signal generating unit 4 generates, on the basis of an output voltage phase angle command θ* input from the outside and the modulation factor PMF input via the modulation-factor computing unit 8, the switching signals SWu, SWv, and SWw for controlling the power converting unit 2. Specifically, the modulated-wave generating unit 6 outputs modulated waves αu, αv, and αw, which are AC waveform signals generated on the basis of the output voltage command |V*|, as signals. The carrier-wave generating unit 5 outputs, as a signal, a carrier wave that is based on a saw-tooth wave, a triangular wave, or the like and has a frequency higher than the frequency of the modulated wave. The frequency of the carrier wave is basically a switching frequency of the power converting unit 2 except the case of the over-modulation mode. The modulated wave generated by the modulated-wave generating unit 6 and the carrier wave generated by the carrier-wave generating unit 5 are independent signals not synchronizing with each other in the asynchronous mode, and are generated as signals synchronizing with each other in the synchronous mode. The carrier wave signals and the modulated wave signals are input to the comparing unit 7. The switching signals SWu, SWv, and SWw are generated on the basis of a magnitude relation of respective signal values that change every moment and are output to the power converting unit 2.

For example, when the power converting unit 2 is a two-level inverter, signals described below corresponding to a magnitude relation between the modulated wave and the carrier wave are generated as switching signals output to the power converting unit 2.

(a) In a period in which the modulated wave>the carrier wave

A signal for selecting high-order side potential of a DC voltage input (b) In a period in which the modulated wave<the carrier wave A signal for selecting low-order side potential of the DC voltage input Note that the AC load 1 is shown as a three-phase load in FIG. 1. However, the AC load 1 can be a multi-phase AC load to which a multi-phase alternating voltage is applied. When the AC load 1 is the multi-phase alternating load, signals corresponding to respective phases are generated as the modulated wave, and the carrier wave and the modulated wave are compared with respect to the respective phases, whereby switching signals corresponding to the respective phases are generated and output to the power converting unit 2.

In this way, the switching signals generated by the switching-signal generating unit 4 are output to the power converting unit 2, the PWM modulation is performed, and the DC power is converted into the multi-phase AC power, and the AC load 1 is driven.

Note that the control method explained in the preceding paragraphs is a publicly-known technology and is applied in the respective modulation mode in common. More detailed contents are described in, for example, Non Patent Literature 1 described above. Therefore, further explanation is omitted.

Control methods in the respective modulation modes are explained. However, as explained above, the publicly-known control method disclosed in Non Patent Literature 1 and the like can be applied concerning the asynchronous mode and the synchronous one pulse mode. Therefore, explanation of the asynchronous mode and the synchronous one pulse mode is omitted. The synchronous multi-pulse mode and the over-modulation synchronous mode (hereinafter sometimes simply referred to as "over-modulation mode" as well) are explained below.

The synchronous multi-pulse mode is a modulation mode provided to more smoothly perform a shift from the asynchronous mode to the over-modulation synchronous mode explained below. Specifically, the synchronous multi-pulse mode is a modulation mode in which the modulated wave and the carrier wave are synchronized. In this embodiment, the synchronous multi-pulse mode is a synchronous twenty-seven pulse mode in which the number of pulses included in one cycle of an AC output is twenty-seven. However, the number of pulses included in one cycle only has to be a multiple of 3 and an odd number. However, the number of pulses is set to be larger than the number of pulses in the over-modulation synchronous mode explained below. The synchronous multi-pulse mode is applied while the asynchronous mode shifts to the over-modulation synchronous mode. However, the asynchronous mode can be directly switched to the over-modulation synchronous mode. Further, in this embodiment, the over-modulation synchronous mode in which the carrier wave and the modulated wave are synchronized is applied as the over-modulation mode. However, an over-modulation asynchronous mode in which the carrier wave and the modulated wave are not synchronized can be applied as the over-modulation mode. In such a case, it is desirable to directly transition the asynchronous mode to the over-modulation asynchronous mode.

Subsequently, the over-modulation synchronous mode applied in this embodiment is explained in comparison with the conventional over-modulation mode. Various methods are conceivable as a specific method for realizing the over-modulation mode. However, in the conventional over-modulation mode, for example, as disclosed in Patent Literature 1, the over-modulation mode is realized by gradually increasing the maximum amplitude of the modulated wave according to an output voltage command to set a maximum of the modulated wave larger than a maximum value of the carrier wave. In such a conventional over-modulation mode, the over-modulation mode is started at a point in time when the maximum amplitude of the modulated wave is equal to or larger than the maximum value of the carrier wave, that is, at a point in time when the modulation factor is π/4 while a maximum amplitude value of the modulated wave, which is a sine wave, is gradually increased according to an output voltage command in the asynchronous mode. That is, because the asynchronous mode shifts to the over-modulation mode when the maximum amplitude value of the modulated wave is gradually increased according to the output voltage command, the over-modulation mode is naturally started when the modulation factor is π/4. In the over-modulation mode, the magnitude relation between the modulated wave and the carrier wave is fixed for a fixed period centering on a phase of the maximum amplitude value of the modulated wave. A carrier wave pulse included in the period is not actually output. The switching is stopped. Therefore, when the modulation factor is equal to or higher than π/4, it is possible to suppress occurrence of the narrow pulse around the peak value of the output voltage.

In the conventional over-modulation mode, a stop period of the switching is continuously increased by gradually increasing an amplitude value of the modulated wave as the output frequency increases even after the over-modulation mode is started. That is, the conventional over-modulation mode is started from the point in time when the modulation factor is π/4 while the modulation factor is continuously increased from the asynchronous mode. Thereafter, the switching stop period in the over-modulation mode continuously changes. As a result, even when the modulation factor is equal to or higher than π/4, the narrow pulse is likely to occur immediately before a switching stop section while the modulation factor transitionally changes.

Figure 4:
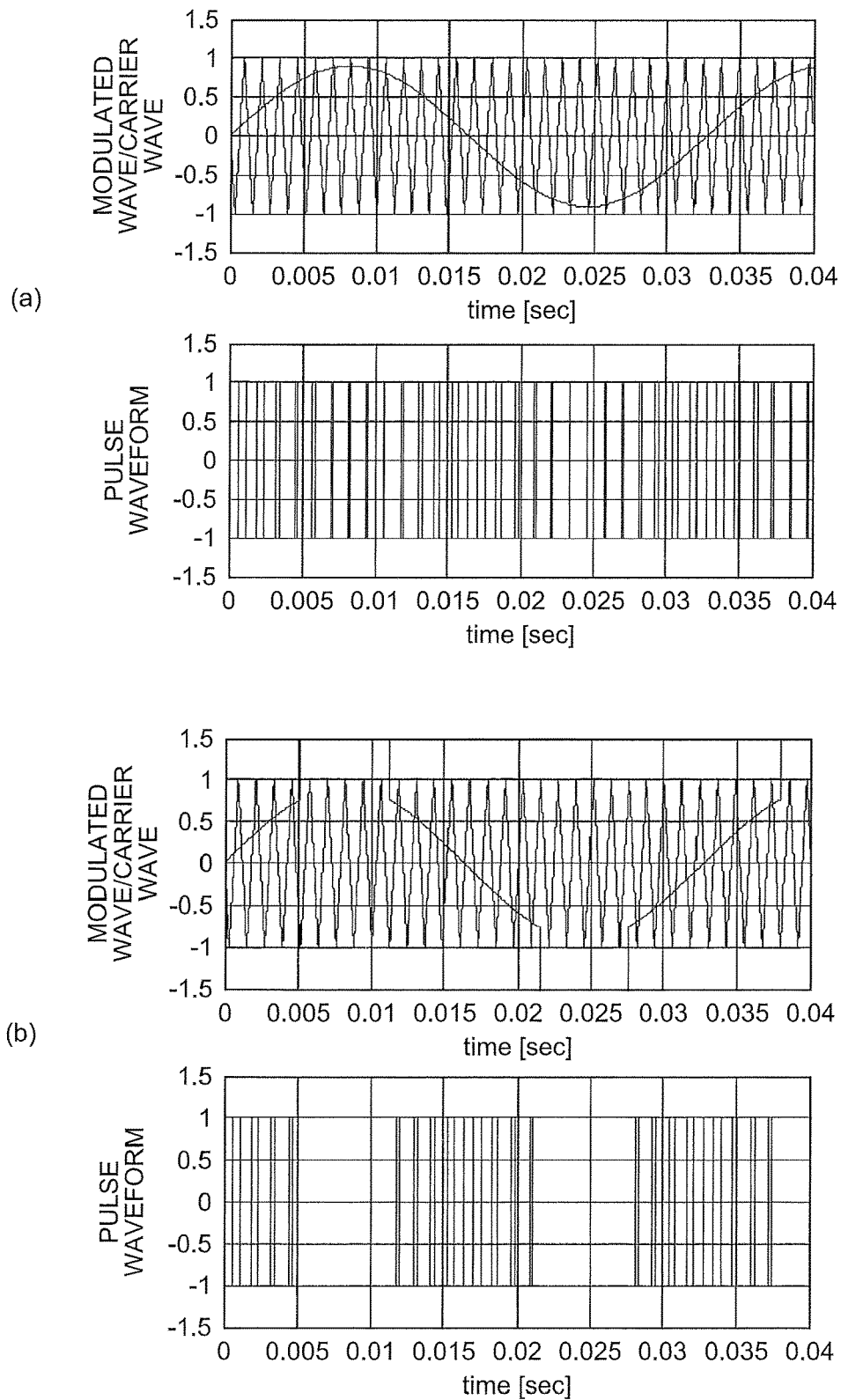
FIG. 4 is a diagram showing pulse waveforms of a synchronous multi-pulse mode and an over-modulation mode applied to the power converter according to the first embodiment.

The over-modulation mode applied in this embodiment is explained. FIG. 4(a) is a diagram showing the modulated wave and the carrier wave and a pulse waveform in the synchronous multi-pulse mode (the synchronous twenty-seven pulse mode). FIG. 4(b) is a diagram showing the modulated wave and the carrier wave and a pulse waveform in the over-modulation synchronous mode applied in this embodiment. In FIG. 4(a) and FIG. 4(b), a figure in each upper part indicates the modulated wave and the carrier wave, and a figure in each lower part indicates the pulse waveform. Note that the modulation factor PMF in FIG. 4 is 0.75. In FIG. 4(a), although the modulation factor PMF is 0.75 smaller than π/4, the narrow pulse occurs around a peak value (a peak value of the modulated wave) in an output voltage as shown in the figure. Therefore, in the conventional over-modulation mode started from a point in time when the modulation factor PMF is equal to or higher than π/4, the occurrence of the narrow pulse cannot be suppressed.

On the other hand, in the over-modulation mode applied in this embodiment, as shown in FIG. 4(b), the modulated wave is not associated with a sine wave calculated according to an output voltage command in a specific phase section ("specific phase section" is hereinafter referred to merely as "specific phase section", or referred to as "first period" on a positive side of an AC output and "second period" on a negative side of the AC output). A signal having a value larger than a value of the carrier wave (a smaller value on the negative side) is output as the modulated wave such that the switching is stopped in the specific phase section and a pulse around the peak value, which is a factor of the narrow pulse occurrence, is eliminated. Note that the specific phase section is a period including a peak value (a maximum or a minimum) on the positive side (or the negative side) of the AC output voltage (or the output voltage command). Note that, in this embodiment, the modulated wave is set to a value different from a value of a normal sine wave in the specific phase section to stop the switching. However, the switching can be stopped by setting a value of the carrier wave to a value different from a value of a triangular wave or the like (e.g., any value equal to or smaller than 0 on the positive side and any value equal to or larger than 0 on the negative side) such that a magnitude relation between the modulated wave and the carrier wave is fixed in the specific phase section.

In FIG. 4(b), five pulses equivalent to five cycles of the carrier wave are eliminated in each of a positive section and a negative section on the basis of a waveform of the synchronous twenty-seven pulse mode. As a result, seventeen pulses are output in one cycle. Because the specific phase section for independently stopping the switching irrespective of the output voltage command is provided, a start of the over-modulation mode can be optionally set. The modulation mode is started from a point in time when the modulation factor is any modulation factor lower than π/4. The occurrence of the narrow pulse is suppressed even when the modulation factor is lower than π/4. Further, the specific phase section, in which the switching is stopped, is discontinuously set according to the modulation factor to more surely suppress the occurrence of the narrow pulse even under a transitional situation in which an output frequency after the start of the over-modulation mode increases.

In the over-modulation synchronous mode applied in this embodiment, the specific phase section, in which the switching is stopped, is increased stepwise as the modulation factor increases. The specific phase section is set such that the number of pulses eliminated from the number of pulses of the synchronous twenty-seven pulse mode serving as a reference is also increased stepwise. Therefore, in the same over-modulation synchronous mode, there are a plurality of modulation modes in which specific phase sections, in which the switching is stopped, are different. In an example explained below, the number of pulses included in one cycle is changed to seventeen, thirteen, nine, and five in the over-modulation synchronous mode. Modulation modes in the respective numbers of pulses are referred to as over-modulation synchronous seventeen pulse mode, over-modulation synchronous thirteen pulse mode, over-modulation synchronous nine pulse mode, and over-modulation synchronous five pulse mode.

As an example of a specific control method of the over-modulation synchronous mode applied in this embodiment, the operations of the carrier-wave generating unit 5, the modulated-wave generating unit 6, and the comparing unit 7 included in the switching-signal generating unit 4 and the modulation-factor computing unit 8 are explained below.

First, the modulation-factor computing unit 8 calculates the modulation factor PMF according to the following expression using the DC voltage EFC detected by the voltage detecting unit 10 and the output voltage command |V*|, which is a command value of an AC voltage applied to the AC load 1 by the power converting unit 2 when the AC load 1 is driven.

$$|V^*|\sqrt{(Vd^2+Vq^2)} \quad (1)$$

$$PMF=(\pi/\sqrt{(6)})\times|V^*|/EFC \quad (2)$$

Referring back to FIG. 1, information concerning the modulation factor PMF computed by the modulation-factor computing unit 8 is input to the modulated-wave generating unit 6. The modulated-wave generating unit 6 generates the modulated waves αu, αv, and αw of a U phase, a V phase, and a W phase on the basis of the output voltage phase angle command θ* and the modulation factor PMF computed by the modulation-factor computing unit 8. The internal configuration and detailed operation of the modulated-wave generating unit 6 are explained below.

The carrier-wave generating unit 5 generates a carrier wave Ca common to the U phase, the V phase, and the W phase on the basis of the output voltage phase angle command θ*. The comparing unit 7 compares, for each of the phases, the modulated waves αu, αv, and αw generated by the modulated-wave generating unit 6 and the carrier wave Ca generated by the carrier-wave generating unit 5 and generates switching signals SWu, SWv, and SWw, which are control signals for the power converting unit 2, on the basis of a comparison result. The power converting unit 2 is controlled according to the switching signals SWu, SWv, and SWw and applies an output voltage based on the output voltage command |V*| to the AC load 1 to drive the AC load 1.

Figure 5:
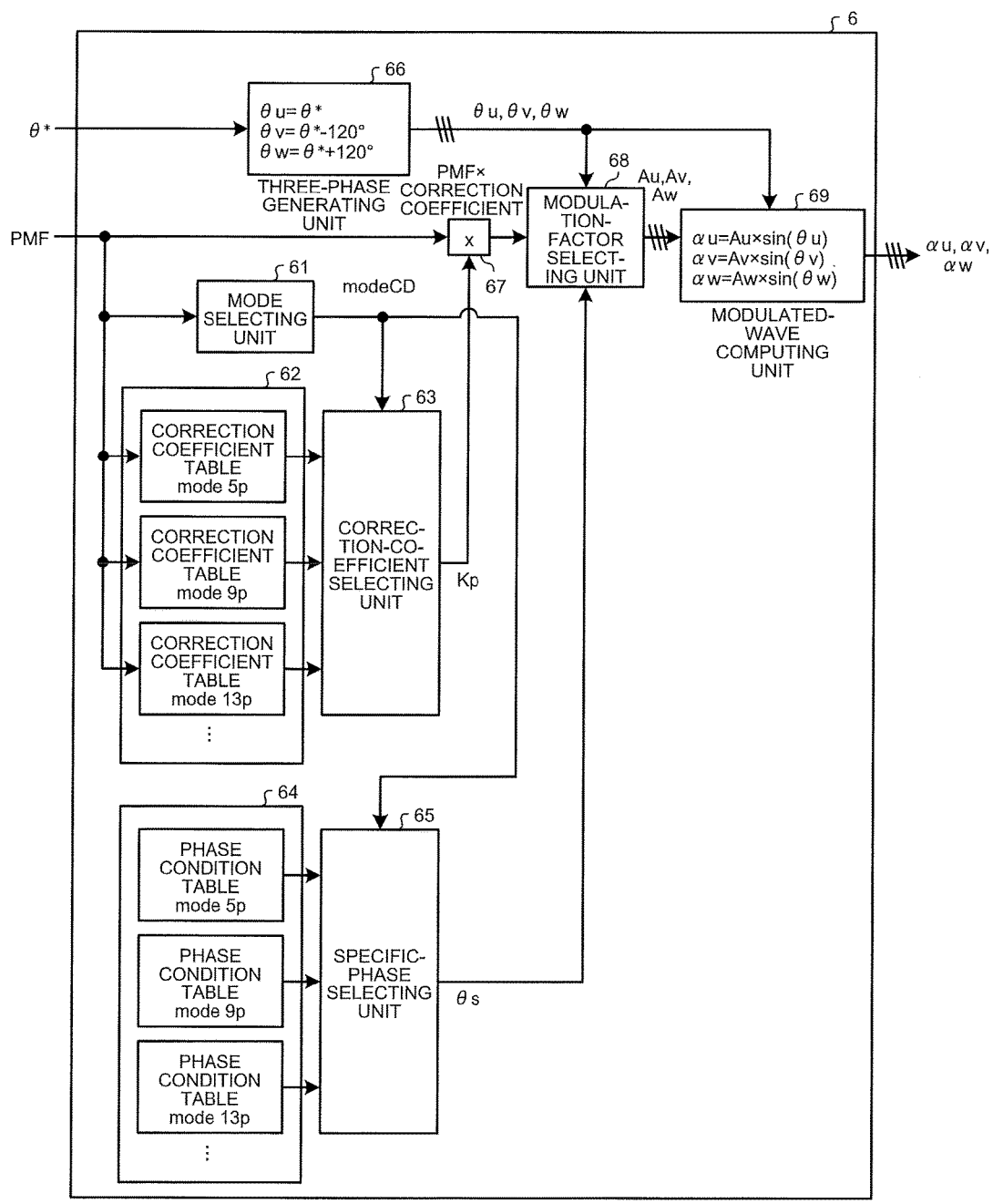
FIG. 5 is a diagram showing a configuration example of a modulated-wave generating unit.

Details of the modulated-wave generating unit 6 are explained with reference to the drawing of FIG. 5. FIG. 5 is a diagram showing a configuration example of the modulated-wave generating unit 6. As shown in FIG. 5, the modulated-wave generating unit 6 includes a mode selecting unit 61, a correction-coefficient table group 62, a correction-coefficient selecting unit 63, a phase-condition table group 64, a specific-phase selecting unit 65, a three-phase generating unit 66, a multiplier 67, a modulation-factor selecting unit 68, and a modulated-wave computing unit 69.

Mode switching in the over-modulation mode is realized by the mode selecting unit 61 generating a mode selection code modeCD on the basis of the modulation factor PMF and the modulation mode being switched on the basis of the mode selection code modeCD. The generated mode selection code modeCD is output to the correction-coefficient selecting unit 63 and the specific-phase selecting unit 65. Note that more detailed processing of the mode selecting unit 61 is explained below.

In the over-modulation synchronous mode applied in this embodiment, a voltage error occurs concerning an output voltage command for stopping the switching independently from the output voltage command value. Therefore, to correct the voltage error, a correction coefficient for correcting the voltage error is stored in the correction-coefficient table group 62. A correction coefficient table for each of the modulation mode and the modulation factor PMF is provided. In FIG. 5, an over-modulation synchronous five pulse mode (hereinafter referred to as "mode 5p" according to necessity; the same applies to other modes), an over-modulation synchronous nine pulse mode (mode 9p), and an over-modulation synchronous thirteen pulse mode (mode 13p) are illustrated. However, in the power converter in the first embodiment, an over-modulation synchronous seventeen pulse mode (mode 17p) and a synchronous twenty-seven pulse mode (mode 27p) are also assumed. A detailed setting method for the correction coefficient is explained below.

The modulation factor PMF is input to the correction-coefficient table group 62. Correction coefficients corresponding to the modulation factor PMF, that is, candidate values of the correction coefficients are selected from the correction coefficient tables and input to the correction-coefficient selecting unit 63.

Besides the candidates values of the correction coefficients, the mode selection code modeCD from the mode selecting unit 61 is input to the correction-coefficient selecting unit 63. The correction-coefficient selecting unit 63 selects a correction coefficient corresponding to the mode selection code modeCD out of the candidate values of the correction coefficients and outputs the correction coefficient to the multiplier 67. Note that more detailed processing of the correction-coefficient selecting unit 63 is explained below.

In the phase-condition table group 64, a phase angle value called specific phase for determining a specific phase section is stored for each of the modulation modes in the over-modulation synchronous mode in this embodiment. When the specific phase is represented as θs, the specific phase θs can be defined, for example, as indicated by the following expression.

$$\theta s = Nover/Nca \times 90 \ [deg] \quad (4)$$
$$= Nover/Nca \times (\pi/2) \ [rad]$$

In Expression (4) described above, meanings of Nover and Nca are as described below.
Nover: the number of output pulses during over modulation
Nca: The number of waves of a carrier wave in one cycle of a modulated wave Note that the phase-condition table group 64 is configured to store phase angle values computed in advance. However, the phase-condition table group 64 does not particularly need to be limited to this configuration. The phase angle values can be always computed according to Expression (4) described above.

Referring back to FIG. 5, the candidate values of the specific phase θs stored in the phase-condition table group 64 are input to the specific-phase selecting unit 65. The specific-phase selecting unit 65 selects the specific phase θs corresponding to the mode selection code modeCD out of the candidate values of the specific phase θs and outputs the specific phase θs to the modulation-factor selecting unit 68. Note that more detailed processing of the specific-phase selecting unit 65 is explained below.

The output voltage phase angle command θ* is input to the three-phase generating unit 66. The three-phase generating unit 66 generates, on the basis of the output voltage phase angle command θ* inputted, phase angles (hereinafter referred to as "modulated wave phase angles") θu, θv, and θw used in generating the modulated waves αu, αv, and αw and outputs the modulated wave phase angles θu, θv, and θw to the modulation-factor selecting unit 68 and the modulated-wave computing unit 69.

The modulation factor PMF and a correction coefficient Kp from the correction-coefficient selecting unit 63 are input to the multiplier 67. The multiplier 67 multiplies the modulation factor PMF with the correction coefficient Kp and outputs the modulation factor PMF to the modulation-factor selecting unit 68.

In addition to the correction coefficient Kp, the specific phases θs from the specific-phase selecting unit 65 and the modulated wave phase angles θu, θv, and θw generated by the three-phase generating unit 66 are input to the modulation-factor selecting unit 68. The modulation-factor selecting unit 68 compares magnitude relations between the respective modulated wave phase angles θu, θv, and θw and the specific phase θs, selects, on the basis of a comparison result of the magnitude relations, one of the modulation factor PMF corrected by the multiplier 67 and a default value of a modulation factor set on the inside of the modulation-factor selecting unit 68, and outputs the modulation factor PMF or the default value to the modulated-wave computing unit 69. To suppress the occurrence of the narrow pulse, the default value is set to a value with which a value of a modulated wave, which is an output of the modulated-wave generating unit 6, is surely larger than a value of a carrier wave. Note that the output of the modulation-factor selecting unit 68 is used as modulation factors Au, Av, and Aw when the modulated-wave computing unit 69 generates a modulated wave. Note that the modulation factors Au, Av, and Aw are values of the modulation factor for avoiding generation of the narrow pulse explained above and are hereinafter referred to as "narrow pulse avoidance modulation factors". More detailed processing of the modulation-factor selecting unit 68 is explained below.

The modulated wave phase angles θu, θv, and θw generated by the three-phase generating unit 66 and the narrow pulse avoidance modulation factors Au, Av, and Aw generated by the modulation-factor selecting unit 68 are input to the modulated-wave computing unit 69. The modulated-wave computing unit 69 generates the modulated waves αu, αv, and αw according to the following expression using the modulated wave phase angles θu, θv, and θw and the narrow pulse avoidance modulation factors Au, Av, and Aw.

$$\alpha u = Au \times \sin(\theta u)$$
$$\alpha v = Av \times \sin(\theta v)$$
$$\alpha w = Aw \times \sin(\theta w) \quad (5)$$

Figure 6:
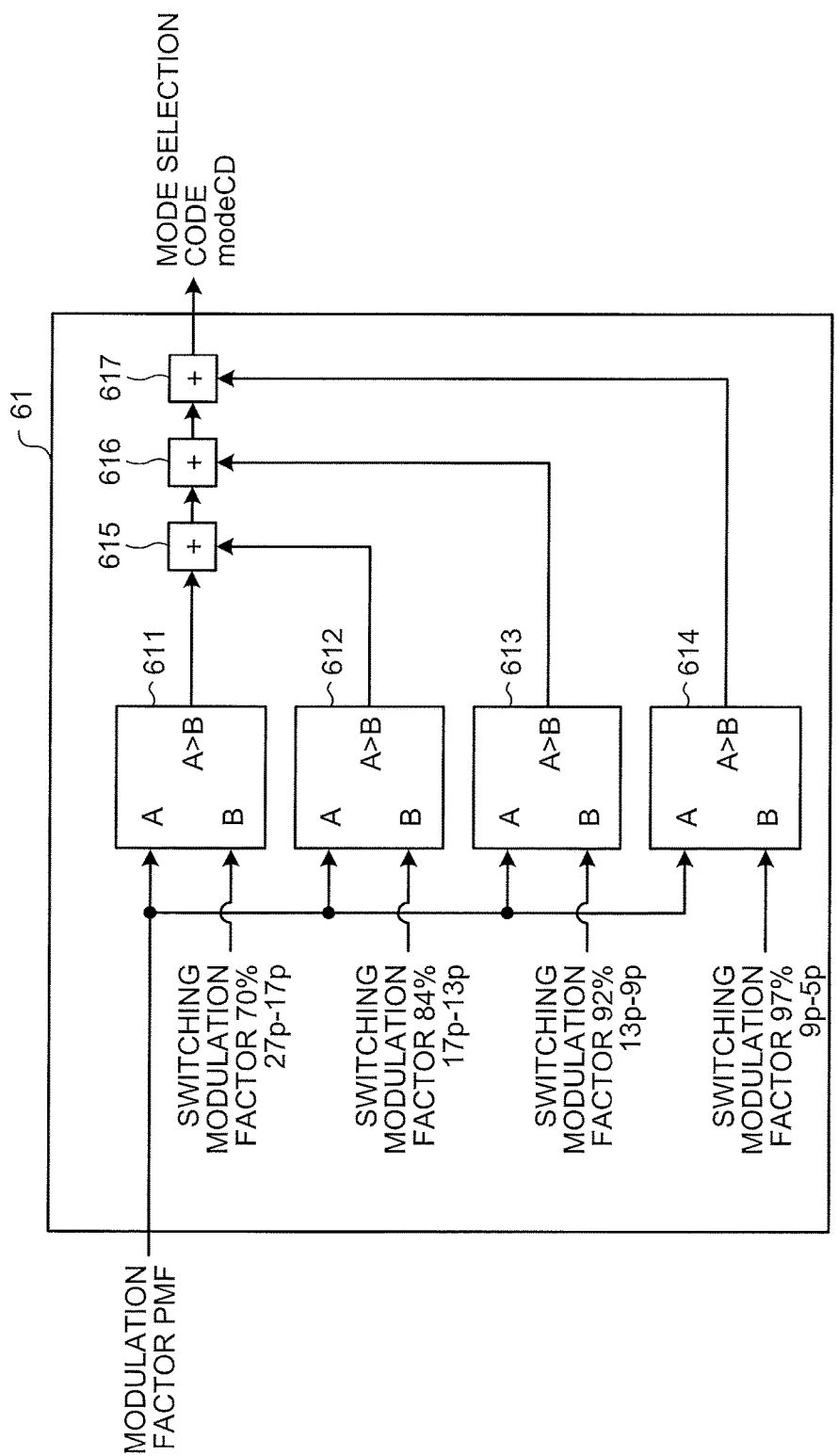
FIG. 6 is a diagram showing a configuration example of a mode selecting unit.

More detailed operation of the mode selecting unit 61 is explained. FIG. 6 is a diagram showing a configuration example of the mode selecting unit 61 shown in FIG. 5. As shown in FIG. 6, the mode selecting unit 61 includes four comparison determiners 611 to 614 and three adders 615 to 617. Each of the comparison determiners 611 to 614 includes an A terminal and a B terminal. The modulation factor PMF is input to the A terminals. On the other hand, values input to the B terminals are different for each of the comparison determiners. Preset values of modulation factors in switching the respective modulation modes are input. The comparison determiner 611 executes mode switching of the synchronous twenty-seven pulse mode and the over-modulation synchronous seventeen pulse mode. The comparison determiner 612 executes mode switching between the over-modulation synchronous seventeen pulse mode and the over-modulation synchronous thirteen pulse mode. The comparison determiner 613 executes mode switching between the over-modulation synchronous thirteen pulse mode and the over-modulation synchronous nine pulse mode. The comparison determiner 614 executes mode switching between the over-modulation synchronous nine pulse mode and the over-modulation synchronous five pulse mode.

Note that, in FIG. 6, only components used for switching between the synchronous twenty-seven pulse mode and the over-modulation synchronous mode, and mode switching in the over-modulation synchronous mode are shown. Therefore, switching between the asynchronous mode and the synchronous twenty-seven pulse mode, and switching between the over-modulation synchronous mode and the synchronous one pulse mode are not shown. However, a mode switching method explained below only has to be applied in the same manner.

In this embodiment, a switching modulation factor from the synchronous twenty-seven pulse mode to the over-modulation synchronous seventeen pulse mode (the second mode switching modulation factor PMF2: see FIG. 2) is set to 70% (a modulation factor 0.7), a switching modulation factor from the over-modulation synchronous seventeen pulse mode to the over-modulation synchronous thirteen pulse mode is set to 84% (a modulation factor 0.84), a switching modulation factor from the over-modulation synchronous thirteen pulse mode to the over-modulation synchronous nine pulse mode is set to 92% (a modulation factor 0.92), and a switching modulation factor from the over-modulation synchronous nine pulse mode to the over-modulation synchronous five pulse mode is set to 97% (a modulation factor 0.97). However, it goes without saying that the switching modulation factors are not limited to the specific values of the mode switching modulation factors.

For example, a value "70%", that is, "0.7" is input to the B terminal of the comparison determiner 611. In the first embodiment, the value "70%" is a modulation factor in switching the modulation mode from a "non-over-modulation synchronous twenty-seven pulse mode" to the "over-modulation synchronous seventeen pulse mode". In the first embodiment, the modulation factor during the 180° energization in one pulse mode is set to "1" as explained above. However, a 70% value at the time when the modulation factor is set to "1" is a modulation factor in switching the "non-over-modulation synchronous twenty-seven pulse mode" to the "over-modulation synchronous seventeen pulse mode". In FIG. 6, this is written as "switching modulation factor 70% 27p-17p". In the following explanation, the other switching modulation factors are written the same.

Continuing the explanation, a switching modulation factor 84% in switching the modulation mode from the "over-modulation synchronous seventeen pulse mode" to the "over-modulation synchronous thirteen pulse mode" is input to the B terminal of the comparison determiner 612, a switching modulation factor 92% in switching the modulation mode from the "over-modulation synchronous thirteen pulse mode" to the "over-modulation synchronous nine pulse mode" is input to the B terminal of the comparison determiner 613, and a switching modulation factor 97% in switching the modulation mode from the "over-modulation synchronous nine pulse mode" to the "over-modulation synchronous five pulse mode" is input to the B terminal of the comparison determiner 614.

The comparison determiners 611 to 614 output "1" when A>B is satisfied and output "0" when A>B is not satisfied, that is, when A≤B is satisfied. The adder 615 adds an output of the comparison determiner 612 to an output of the comparison determiner 611. The adder 616 adds an output of the comparison determiner 613 to an output of the adder 615. The adder 617 adds an output of the comparison determiner 614 to an output of the adder 616. An output of the adder 617 is output as the mode selection code modeCD. The operation of the mode selecting unit 61 explained above is summarized as follows.

(a) Modulation mode: the non-over-modulation synchronous twenty-seven pulse mode
Modulation factor: equal to or lower than 70% (the second mode switching modulation factor PMF2)
Mode selection code modeCD=0
(b) Modulation mode: the over-modulation synchronous seventeen pulse mode
Modulation factor: higher than 70% and equal to or lower than 84%
Mode selection code modeCD=1
(c) Modulation mode: the over-modulation synchronous thirteen pulse mode
Modulation factor: higher than 84% and equal to or lower than 92%
Mode selection code modeCD=2
(d) Modulation mode: the over-modulation synchronous nine pulse mode
Modulation factor: higher than 92% and equal to or lower than 97%
Mode selection code modeCD=3
(e) Modulation mode: the over-modulation synchronous five pulse mode
Modulation factor: higher than 97%
Mode selection code modeCD=4

Figure 7:
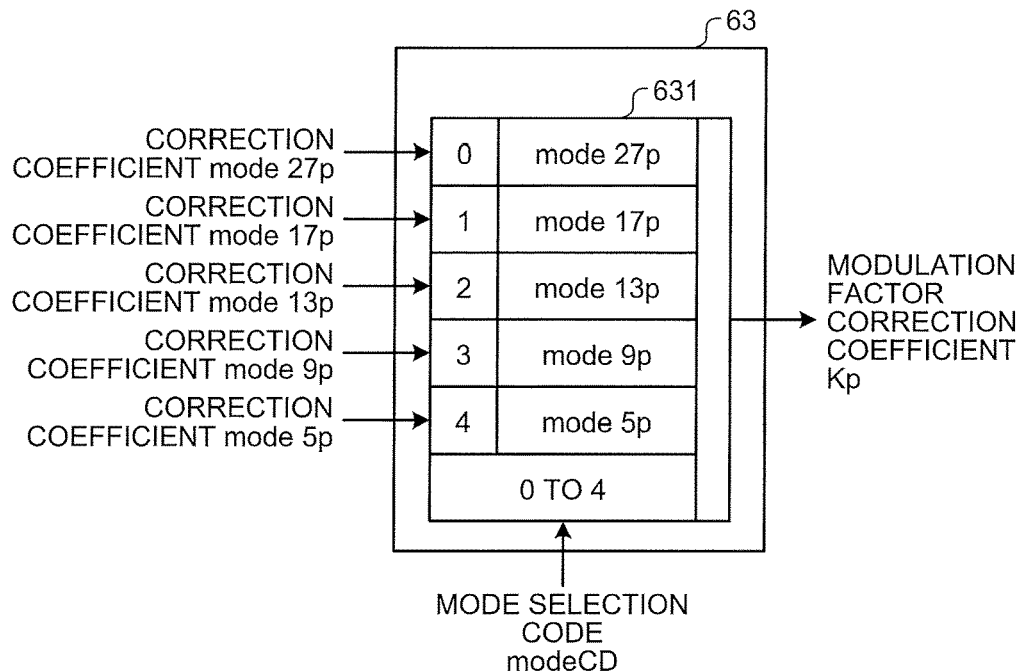
FIG. 7 is a diagram showing a configuration example of a correction-coefficient selecting unit.

More detailed operation of the correction-coefficient selecting unit 63 is explained. FIG. 7 is a diagram showing a configuration example of the correction-coefficient selecting unit 63 shown in FIG. 5. As shown in FIG. 7, the correction-coefficient selecting unit 63 includes a modulation-factor-correction-coefficient storing unit 631. A correction coefficient set in advance according to the modulation mode is input to the correction-coefficient selecting unit 63. As shown in the figure, a storage area corresponding to the mode selection code modeCD is provided in the modulation-factor-correction-coefficient storing unit 631. The correction coefficient corresponding to the modulation mode is stored in an area corresponding to the correction coefficient. For example, a correction coefficient in the synchronous twenty-seven pulse mode is stored in an area described as "mode27p". The correction-coefficient selecting unit 63 sets the inputted mode selection code modeCD as an index and outputs, as the modulation factor correction coefficient Kp, a correction coefficient stored in an area of the index.

A setting method for the correction coefficient is explained. As explained above, in the over-modulation mode applied in this embodiment, the switching is stopped without taking into account the output voltage command in the specific phase section. Therefore, an output voltage increases by a voltage due to the stop of the switching in the specific phase section. Therefore, it is important to correct an output voltage to be smaller than the output voltage command in a normal switching section (a second section) excluding the specific phase section to adjust the output voltage due to the increase in the specific phase section. Therefore, the correction coefficient is set such that an actual output voltage is smaller than the output voltage command.

Further, the specific phase section is different for each of the pulse modes of the over-modulation synchronous mode. An amount that should be corrected in the switching section is different according to the length of the specific phase section. Therefore, as in this embodiment, it is desirable to prepare an optimum correction coefficient for each of the over-modulation synchronous modes. Taking into account the fact that the specific phase section increases and the amount that should be corrected also increases as the modulation mode shifts from the over-modulation synchronous seventeen pulse mode to the over-modulation synchronous five pulse mode, the optimum correction coefficient for each of the over-modulation synchronous modes is set such that the correction amounts in the switching sections of the modulation modes increase as the number of pulses included in the over-modulation synchronous mode decreases.

Figure 8:
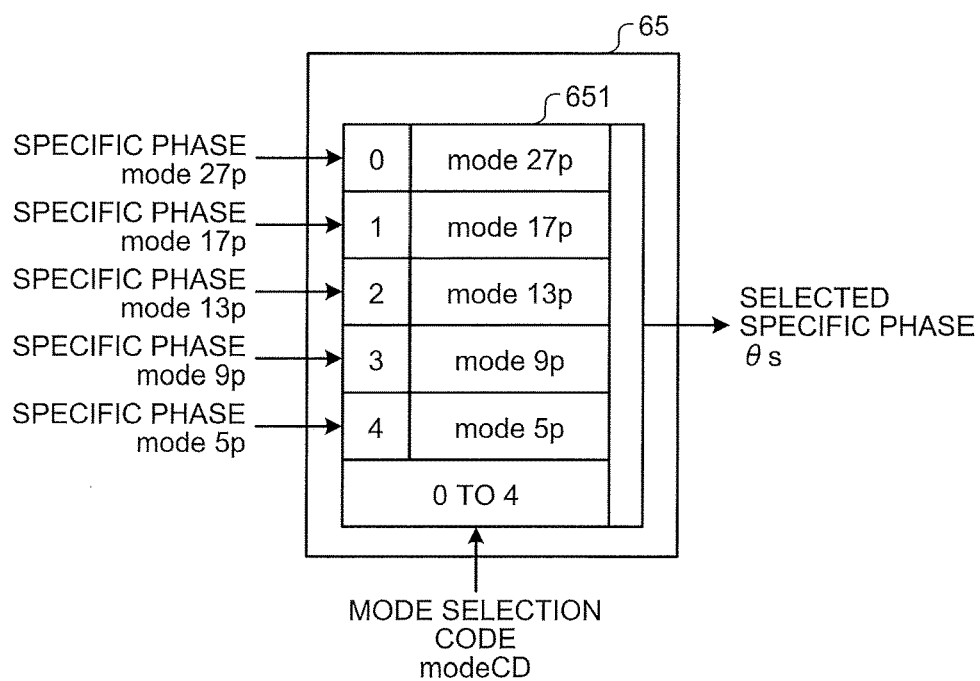
FIG. 8 is a diagram showing a configuration example of a specific-phase selecting unit.

More detailed operation of the specific-phase selecting unit 65 is explained. FIG. 8 is a diagram showing a configuration example of the specific-phase selecting unit 65 shown in FIG. 5. As shown in FIG. 8, the specific-phase selecting unit 65 includes a specific-phase storing unit 651. A specific phase set in advance according to the modulation mode is input to the specific-phase selecting unit 65. As shown in the figure, a storage area corresponding to the mode selection code modeCD is provided in the specific-phase storing unit 651. The specific phase corresponding to the modulation mode is stored in an area corresponding to the specific phase. For example, a specific phase in the over-modulation synchronous seventeen pulse mode is stored in an area described as "mode17p". The mode selection code modeCD is input to the specific-phase selecting unit 65. An area is designated using the mode selection code modeCD as an index. The specific phase θs stored in the area is selected and output. Note that a specific setting method for a specific phase stored in the specific-phase storing unit 651 is explained below.

Figure 9:
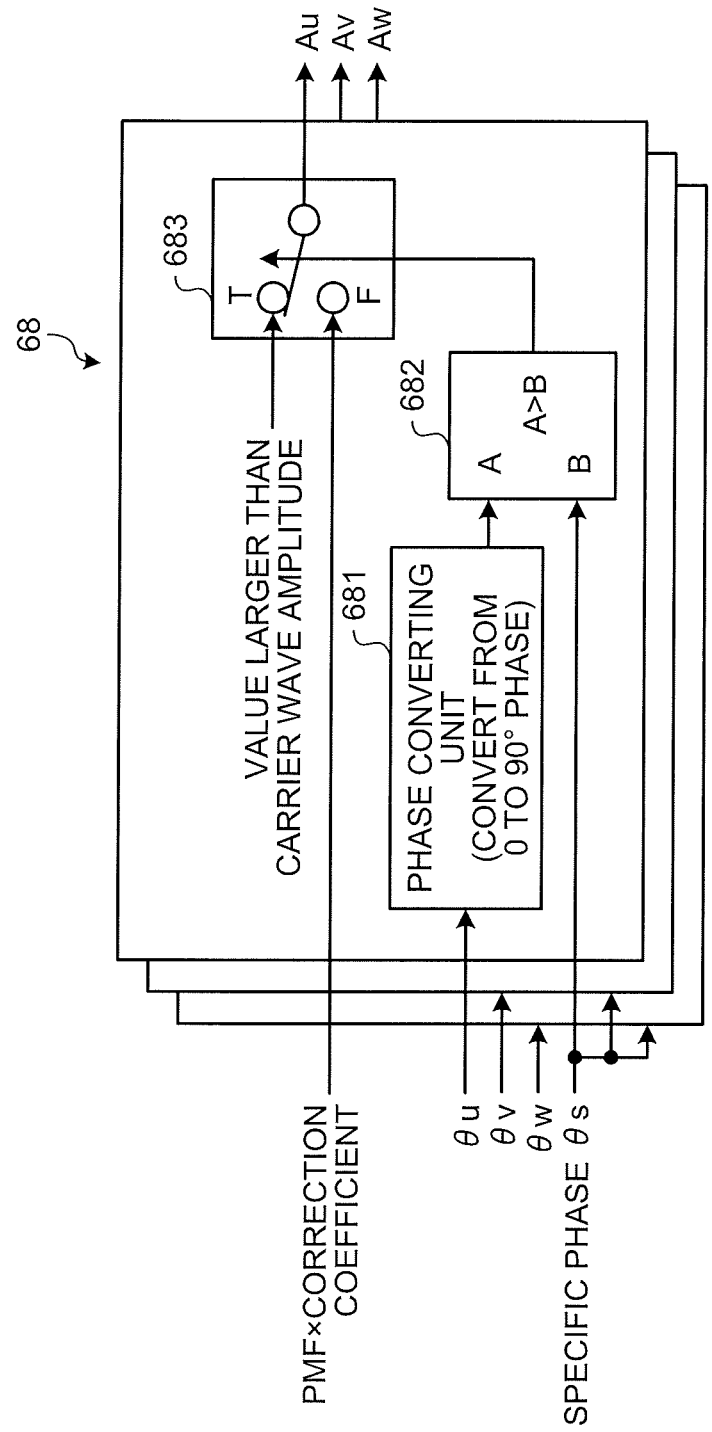
FIG. 9 is a diagram showing a configuration example of a modulation-factor selecting unit.
Figure 10:
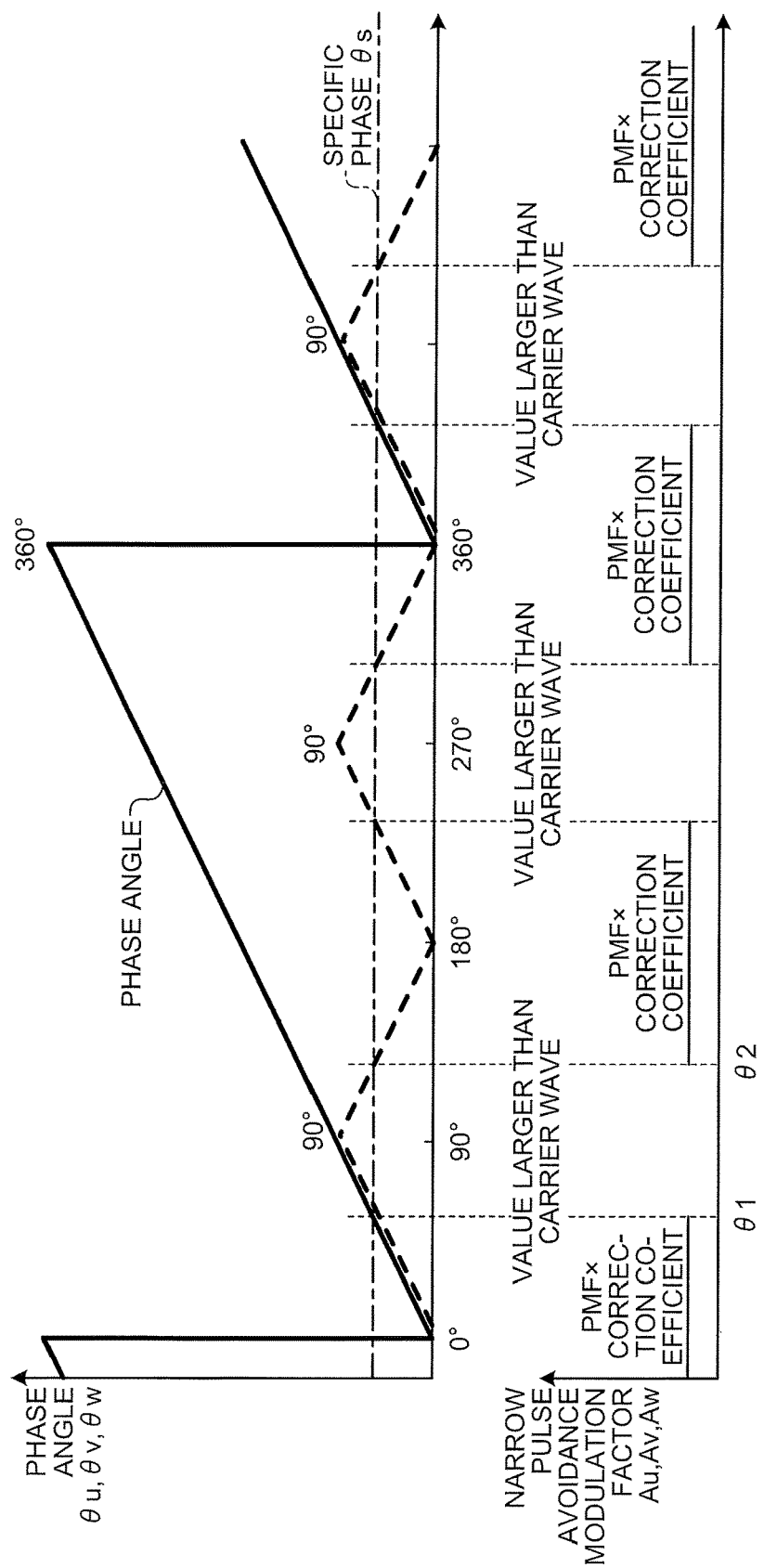
FIG. 10 is a diagram showing an operation example of a modulation-factor selecting unit.

More detailed operation of the modulation-factor selecting unit 68 is explained with reference to the drawings of FIG. 9 and FIG. 10. FIG. 9 is a diagram showing a configuration example of the modulation-factor selecting unit 68. FIG. 10 is a diagram showing an operation example of the modulation-factor selecting unit 68. As shown in FIG. 9, the modulation-factor selecting unit 68 includes a phase converting unit 681, a comparison determiner 682, and a modulated-wave-amplitude switching unit 683. Note that the modulation-factor selecting unit 68 is provided for each of the U, V, and W phases. Operation in the U phase is explained below.

A modulated wave phase angle θu is input to the phase converting unit 681. The phase converting unit 681 converts a value of the modulated wave phase angle θu to a value of 0° to 90°. In a waveform on the upper part side of FIG. 10, a waveform indicated by a thick solid line is a waveform of the phase angle θu input to the phase converting unit 681. A triangular waveform indicated by a thick broken line is a waveform output from the phase converting unit 681. When phase angles output by the phase converting unit 681 are represented as θu', θv', and θw', for example, the phase angle θu' can be represented as indicated by the following expression.

$\theta u' = \theta u (0° \leq \theta u < 90°)$ $\theta u' = 180° - \theta u (90° \leq \theta u < 180°)$ $\theta u' = \theta u - 180° (180° \leq \theta u < 270°)$ $\theta u' = 360° - \theta u (270° \leq \theta u < 360°)$ (6)

Note that θv' and θw' can be represented the same as Expression (6) described above.

An output of the phase converting unit 681, that is, the phase angle θu is input to an A terminal of the comparison determiner 682. The specific phase θs from the specific-phase selecting unit 65 is input to a B terminal. In the waveform on the upper part side of FIG. 10, a waveform indicated by an alternate long and short dash line drawn in parallel to the horizontal axis represents the specific phase θs.

When the phase angle θu input to the A terminal is smaller than the specific phase θs input to the B terminal, that is, when θu<θs, an output of the comparison determiner 682 is "0" (FALSE). The modulated-wave-amplitude switching unit 683 selects and outputs "PMF×correction coefficient". On the other hand, when the phase angle θu is larger than or equal to the specific phase θs, that is, when θu≥θs, the output of the comparison determiner 682 is "1" (TRUE). The modulated-wave-amplitude switching unit 683 selects and outputs "a value larger than carrier wave amplitude" set in advance. The output of the modulated-wave-amplitude switching unit 683 is sent to a processing unit in a post stage, that is, the modulated-wave computing unit 69 as the narrow pulse avoidance modulation factor Au.

As shown in FIG. 10, when a phase angle θ of an intersection of the phase angle θu' indicated by a thick broken line and the specific phase θs indicated by an alternate long and short dash line is represented as θ1, θ2, for example, in a range in which the phase angle θu is equal to or larger than 0° and equal to or smaller than θ1 and in a range in which the phase angle θu is equal to or larger than θ2 and equal to or smaller than 180°, PMF×"the correction coefficient" is selected as the narrow pulse avoidance modulation factor Au, Av, and Aw. In a range in which the phase angle θu is equal to or larger than θ1 and equal to or smaller than θ2, the default explained above, that is, "the value larger than the carrier wave amplitude", which is the input value to the modulated-wave-amplitude switching unit 683, is selected. By performing the control in this way, it is possible to suppress the occurrence of the narrow pulse explained in the technical problem section. Note that a reason why the occurrence of the narrow pulse can be suppressed is explained below.

Figure 11:
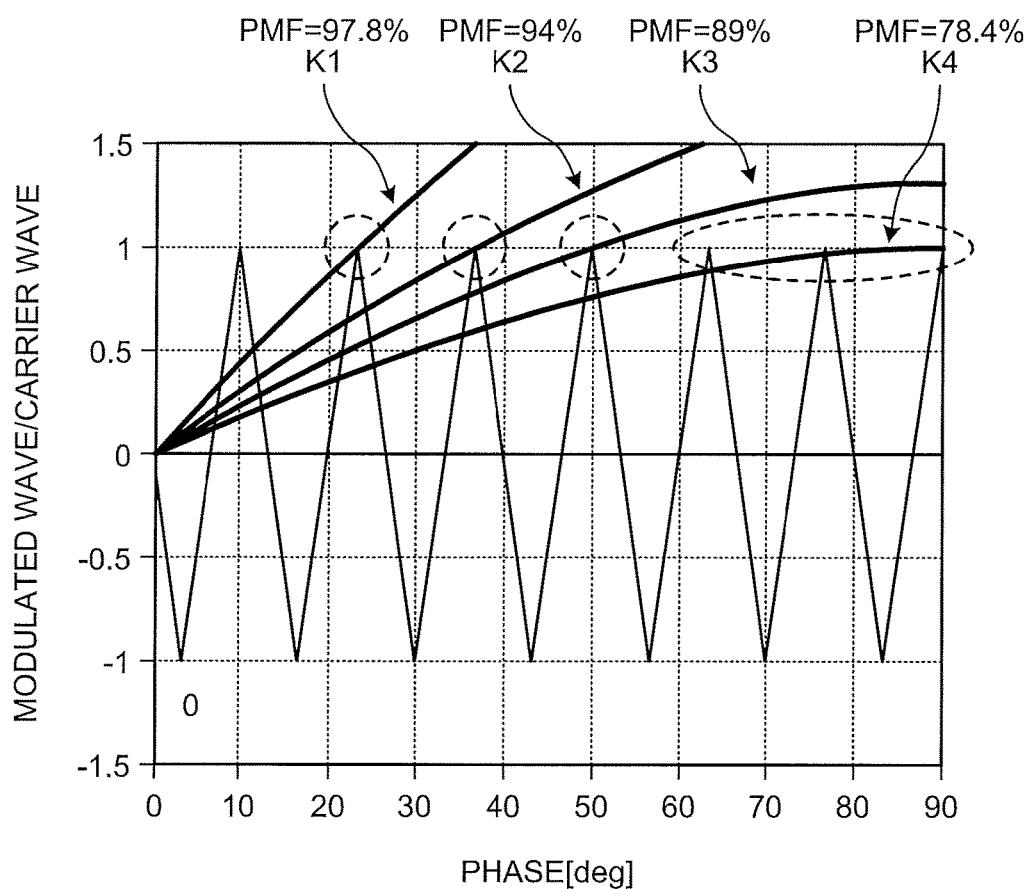
FIG. 11 is a diagram for explaining occurrence of a narrow pulse.
Figure 12:
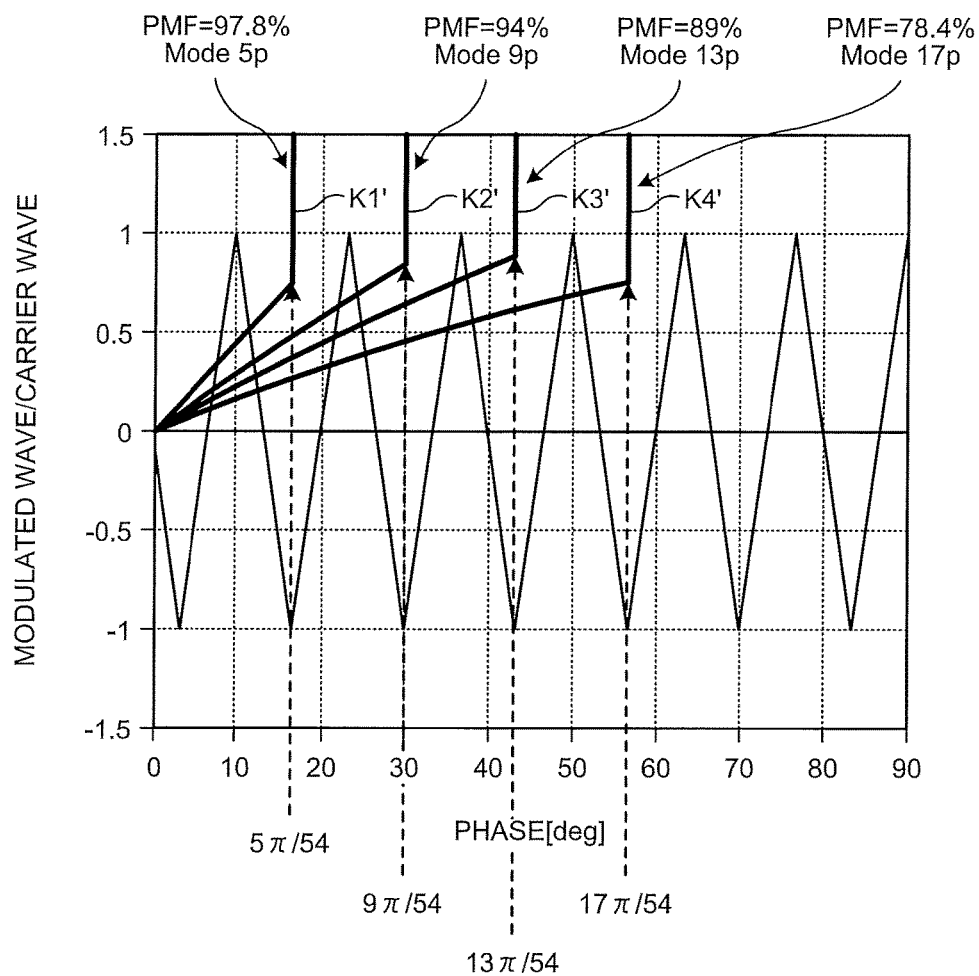
FIG. 12 is a diagram for explaining a method of suppressing the occurrence of the narrow pulse.

FIG. 11 is a diagram for explaining occurrence of the narrow pulse in the conventional over-modulation mode. FIG. 12 is a diagram for explaining a method of suppressing occurrence of the narrow pulse in the over-modulation mode applied in this embodiment. In both of FIG. 11 and FIG. 12, a thin solid line is a waveform of a carrier wave (the number of waves in one cycle=27) in the synchronous twenty-seven pulse mode and indicates a range of ¼ of one cycle, that is, a phase angle of 0° to 90°. In a waveform indicated by a thick solid line, a waveform K1 is a waveform of a modulated wave at the time of the modulation factor PMF=97.8%. Similarly, a waveform K2 is a waveform of a modulated wave at the time of the modulation factor PMF=94%, a waveform K3 is a waveform of a modulated wave at the time of the modulation factor PMF=89%, and a waveform K4 is a waveform of a modulated wave at the time of the modulation factor PMF=78.4%. The respective modulation factors illustrate modulation factors at the time when the modulated wave and the vertex of the carrier wave, which is a triangular wave, are in contact.

In FIG. 11, it is seen that, in portions indicated by broken lines, phase angle width of portions where the modulated wave and the carrier wave cross is small. At modulation factors near the modulation factors illustrated in FIG. 11, it is difficult to avoid the occurrence of the narrow pulse in the portions indicated by the broken lines in FIG. 11.

On the other hand, in a method shown in FIG. 12, control for suppressing the occurrence of the narrow pulse is performed. Specifically, in a specific phase section where a phase angle exceeds a specific phase, a modulation factor is changed to an independent large value irrespective of an output voltage command such that a modulated wave is always larger than a carrier wave and a magnitude relation between the modulated wave and the carrier wave is fixed. Note that, in an illustrated example, a value of the modulated wave in the specific phase section is set to a value equal to or larger than 1.5. However, the value of the modulated wave can be any value as long as the value of the modulated wave is larger than the amplitude of the carrier wave. The value of the modulated wave does not have to be a fixed value as long as the value of the modulated wave is a value larger than the amplitude of the carrier wave. The value does not have to be the same for each of the modes. Further, as explained above, in this embodiment, the modulated wave is set to the value different from the normal sine wave in the specific phase section to stop the switching. However, the switching can be stopped by setting a value of the carrier wave to a value different from a triangular wave (e.g., any value equal to or smaller than 0 on the positive side of an AC output and any value equal to or larger than 0 on the negative side) such that a magnitude relation between the modulated wave and the carrier wave in the specific phase section is fixed.

For example, in the configuration shown in FIG. 5, the control explained above is equivalent to processing of the correction-coefficient selecting unit 63, the multiplier 67, and the modulation-factor selecting unit 68 for multiplying the modulation factor PMF with the correction coefficient Kp. In the over-modulation mode applied in this embodiment, for example, in the case of a waveform K4' at the time of the modulation factor PMF=78.4%, the modulation factor is changed to a large value when the phase angle exceeds 17π/54. The phase angle 17π/54 is the specific phase θs shown in Expression (4) described above. Note that PWM pulses are generated at ridges of 4.25 triangular waves present at the phase angles of 0 to 17π/54 [rad] by this control. However, PWM pulses are not generated at ridges of 2.5 triangular waves present at the phase angles of 17π/54 [rad] to 90° and signals that are always ON are generated. The occurrence of the narrow pulse explained with reference to FIG. 11 can be avoided by this control. Therefore, it is possible to suppress vibration of an output voltage and suppress occurrence of induction failures.

At the phase angle equal to or larger than 90°, control symmetrical with respect to a straight line passing points of 90° and 270° and orthogonal to the horizontal axis is performed. Therefore, in the case of the waveform K4', in one cycle, seventeen (=4.25×4) PWM pulses are generated and ten (=2.5×4) PWM pulses are not generated. That is, in the case of the waveform K4', the control is performed so as to cancel generation of the ten PWM pulses and generate the seventeen (27-10) PWM pulses among twenty-seven (=17+10) PWM pulses. This is because a control mode by the waveform K4' is referred to as "over-modulation synchronous seventeen pulse mode" and written as "Mode 17p".

In FIG. 12, the same applies in the case of waveforms K1' to K3'. The waveforms K1' to K3' are modulated wave waveforms for generating, respectively, an "over-modulation synchronous five pulse mode (Mode 5p)", an "over-modulation synchronous nine pulse mode (Mode 9p)", and an "over-modulation synchronous thirteen pulse mode (Mode 13p)". Note that the modulation modes in the first embodiment are summarized as follows.

(a) The synchronous twenty-seven pulse mode (Mode27p)
The number of pulses of one cycle: twenty-seven pulses
The number of pulses eliminated centering on 90° and 270° of the phases: none
The specific phase θs: none or π/2 [rad]
(b) The over-modulation synchronous seventeen pulse mode (Mode 17p)
Carrier wave cycle: same as the cycle of the synchronous twenty-seven pulse mode
The number of pulses of one cycle: seventeen pulses
The number of pulses eliminated centering on 90° and 270° of the phases: five pulses each
The specific phase θs=17π/54[rad]
(c) The over-modulation synchronous thirteen pulse mode (Mode 13p)
Carrier wave cycle: same as the cycle of the synchronous twenty-seven pulse mode
The number of pulses of one cycle: thirteen pulses
The number of pulses eliminated centering on 90° and 270° of the phases: seven pulses each
The specific phase θs=13π/54[rad]
(d) The over-modulation synchronous nine pulse mode (Mode 9p)
Carrier wave cycle: same as the cycle of the synchronous twenty-seven pulse mode
The number of pulses of one cycle: nine pulses
The number of pulses eliminated centering on 90° and 270° of the phases: nine pulses each
The specific phase θs=9π/54[rad]
(e) The over-modulation synchronous five pulse mode (Mode 5p)
Carrier wave cycle: same as the cycle of the synchronous twenty-seven pulse mode
The number of pulses of one cycle: five pulses
The number of pulses eliminated centering on 90° and 270° of the phases: eleven pulses each
The specific phase θs=5π/54[rad]

Figure 13:
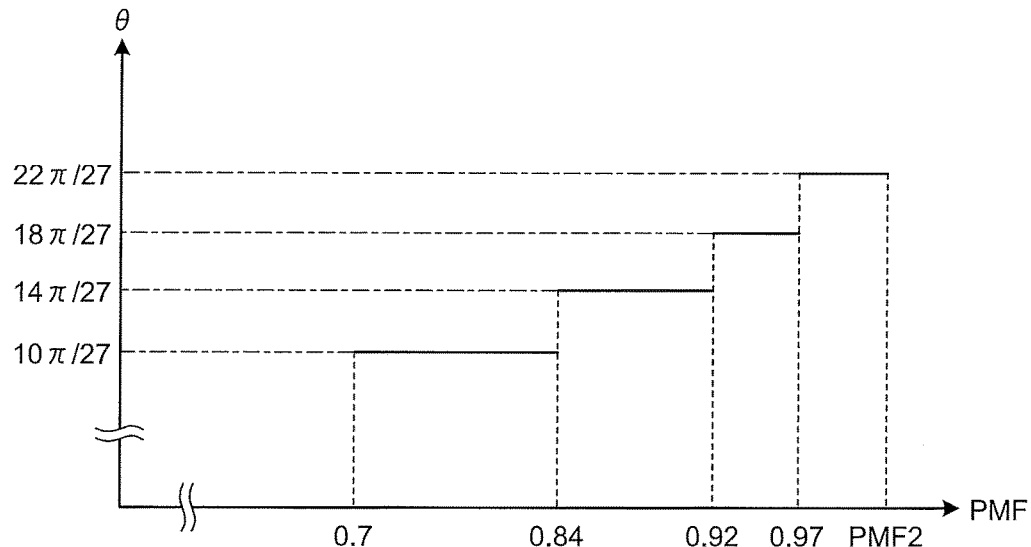
FIG. 13 is a diagram showing phase widths of a specific phase section in the over-modulation mode applied to the power converter according to the first embodiment.

FIG. 13 is a diagram showing phase widths of the specific phase section determined by the specific phases in the over-modulation modes explained above. The horizontal axis is the modulation factor PMF and the vertical axis is the phase width θ of the specific phase section. As shown in FIG. 13, in the over-modulation mode applied in this embodiment, the specific phase section in which the switching is stopped is discontinuously changed stepwise. Therefore, if an appropriate specific phase is selected, the occurrence of the narrow pulse can be suppressed in a transient situation in which the modulation factor increases in the over-modulation mode. Note that the specific phases illustrated in this embodiment are respective phases corresponding to portions of troughs of the carrier wave. However, the specific phases are not limited to the phases. Note that, when the specific phases are the phases corresponding to the portions of the troughs of the carrier wave, the modulated wave and the carrier wave do not cross on the positive side of the AC output in the portions of the troughs. Therefore, it is possible to more surely suppress the occurrence of the narrow pulse.

The specific phases in the respective over-modulation modes are stored in the specific-phase storing unit 651 explained with reference to FIG. 8. The specific phases in the over-modulation modes are regularly shifted by one cycle of the carrier wave at a time to transition the over-modulation mode such that the number of times of switching (the number of pulses) decreases by four in one cycle of the AC output. Consequently, it is possible to transition the over-modulation mode without causing imbalance of the left and the right and the positive and the negative of the AC output. However, the number of times of switching included in the respective over-modulation modes only has to be reduced by a multiple of four at a time and is not limited to be reduced by four at a time.

In this embodiment, the over-modulation mode is started from the over-modulation synchronous seventeen pulse mode. However, when the first triangular wave waveform of the carrier wave is on the negative side as in this embodiment, an over-modulation mode (in this embodiment, an over-modulation synchronous twenty-five pulse mode) obtained by eliminating two pulses located in the each of the centers on the positive side and the negative side from the synchronous multi-pulse mode serving as a reference (in this embodiment, the synchronous twenty-seven pulse mode) is an over-modulation synchronous mode having a largest number of times of switching (hereinafter referred to as "over-modulation synchronous maximum pulse mode"). Therefore, the over-modulation synchronous mode only has to be appropriately selected from over-modulation synchronous modes having the numbers of times of switching obtained by subtracting multiples of four from the over-modulation synchronous maximum pulse mode (in this embodiment, the over-modulation synchronous twenty-five pulse mode).

Further, unlike this embodiment, when the first triangular wave waveform of the carrier wave is on the positive side, an over-modulation mode (an over-modulation synchronous twenty-three pulse modes if the synchronous twenty-seven pulse mode is set as a reference) obtained by eliminating four pulses located in each of the centers on the positive side and the negative side from the synchronous multi-pulse mode serving as a reference (in this embodiment, the synchronous twenty-seven pulse mode) is an over-modulation synchronous maximum pulse mode.

When the above is taken into account, when the first triangular wave waveform of the carrier wave is on the negative side, the over-modulation mode is transitioned by appropriately selecting the over-modulation synchronous mode out of the over-modulation synchronous modes that are obtained by subtracting multiples of four from the over-modulation mode synchronous maximum pulse mode obtained by eliminating two pulses from synchronous multi-pulse mode serving as the reference. In other words, each two pulses on the positive side and the negative side only have to be eliminated from the over-modulation mode synchronous maximum pulse mode obtained by deleting each one pulse on the positive side and the negative side from the synchronous multi-pulse mode serving as the reference. Therefore, the over-modulation mode only has to be transitioned by appropriately selecting the over-modulation synchronous mode out of the over-modulation synchronous modes in each of which the number of pulses (the number of peak values of the carrier wave) eliminated in each of the positive side and the negative side from the synchronous multi-pulse mode serving as the reference is odd numbers. As a result, when the first triangular wave waveform of the carrier wave is on the negative side, the over-modulation mode can be transitioned to the synchronous one pulse mode by reducing the number of times of switching by a multiple of four at a time as the modulation factor increases in the over-modulation mode.

Similarly, when the first triangular wave waveform of the carrier wave is on the positive side, the over-modulation mode is transitioned by appropriately selecting the over-modulation synchronous mode out of the over-modulation synchronous modes that are obtained by subtracting multiples of four from the over-modulation mode synchronous maximum pulse mode obtained by eliminating four pulses from synchronous multi-pulse mode serving as the reference. In other words, each two pulses on the positive side and the negative side only have to be further eliminated from the over-modulation mode synchronous maximum pulse mode obtained by eliminating each two pulses on the positive side and the negative side from the synchronous multi-pulse mode serving as the reference. Therefore, the over-modulation mode only has to be transitioned by appropriately selecting the over-modulation synchronous mode out of the over-modulation synchronous modes in each of which the number of pulses (the number of peak values of the carrier wave) eliminated in each of the positive side and the negative side from the synchronous multi-pulse mode serving as the reference is even numbers. As a result, when the first triangular wave waveform of the carrier wave is on the positive side, the over-modulation mode can be transitioned to the synchronous three pulse mode by reducing the number of times of switching by a multiple of four at a time as the modulation factor increases in the over-modulation mode.

Note that the specific phase is a value at the time when the control for switching the modulation mode in the power converter from a high side to a low side of the number of pulses is performed. When control for switching the modulation mode in the power converter from the low side to the high side of the number of pulses is performed, another value different from the above can be used to prevent chattering of control operation. That is, if hysteresis characteristics are imparted to a specific phase at the time when the modulation mode is switched from the high side to the low side of the number of pulses and to a specific phase at the time when the modulation mode is switched from the low side to the high side of the number of pulses, an effect is obtained that it is possible to prevent chattering of control operation.

Subsequently, a setting method for the second mode switching modulation factor PMF2 serving as a start point of the over-modulation mode applied in this embodiment is explained. The narrow pulse explained with reference to FIG. 4(*a*) and FIG. 11 more easily occurs as the modulation factor is higher and as the carrier wave frequency (the switching frequency) with respect to the output frequency is larger. Therefore, the narrow pulse is likely to occur even at the modulation factor equal to or lower than $\pi/4$ when the carrier wave frequency increases with respect to the output frequency. Therefore, it is desirable to start the over-modulation mode applied in this embodiment from a point in time when the modulation factor is equal to or lower than $\pi/4$. On the other hand, when the modulation factor is sufficiently small, it is unnecessary to apply the over-modulation mode because the narrow pulse is unlikely to occur. Therefore, it is desirable to calculate a lower limit modulation factor, which is a minimum modulation factor at which the narrow pulse is likely to occur, and determine a start point of the over-modulation mode on the basis of the calculated lower limit modulation factor. Note that the lower limit modulation factor is a function of the frequency and the modulation factor indicated by the straight line L3 in FIG. 2.

Figure 14:
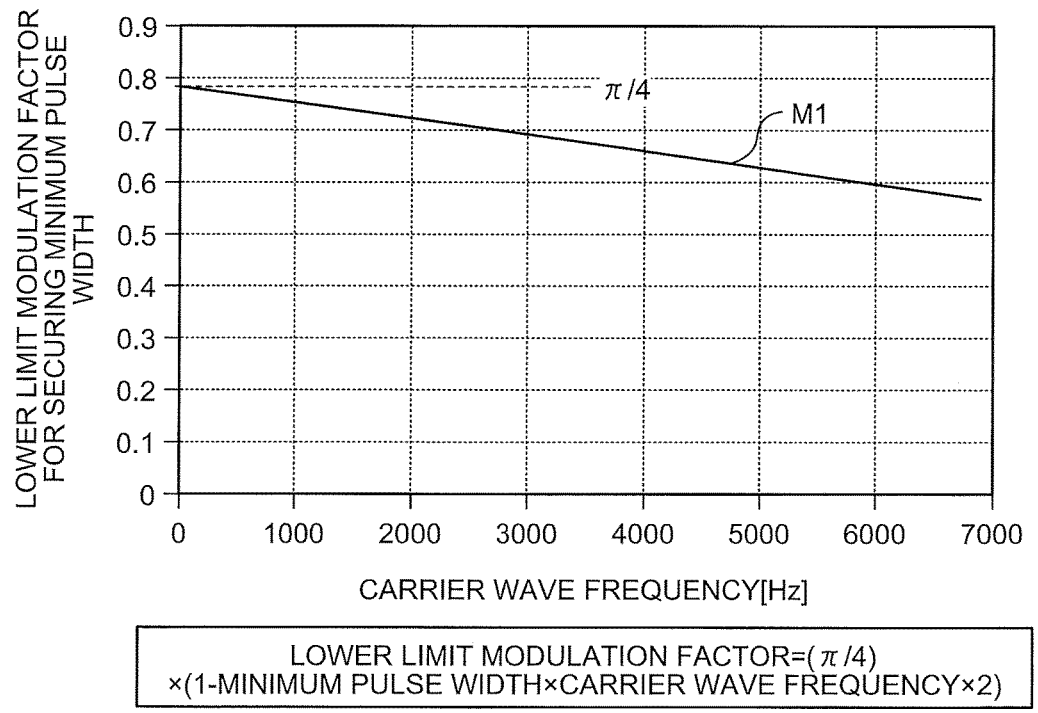
FIG. 14 is a diagram showing a relation between a lower limit modulation factor for securing a minimum pulse width and a carrier wave frequency in the first embodiment.

FIG. 14 is a diagram showing a relation between the lower limit modulation factor for suppressing the occurrence of the narrow pulse and securing the minimum pulse width and the carrier wave frequency. The "minimum pulse width" is a period in which switching elements of the power converting unit 2 should be at least kept on (hereinafter referred to as "minimum ON period") such that the switching elements can stably realize switching operation. After once being turned on, the switching elements are sometimes requested to maintain an ON state to stabilize the ON state. To secure the minimum ON period, a function for outputting, when a narrow pulse narrower than the minimum pulse width is input as a command value, a switching signal to turn on the switching elements for the minimum pulse width rather than a command of the narrow pulse is sometimes provided on the inside of the control section 4. Such a function is referred to as "minimum ON function".

In FIG. 14, the carrier wave frequency is plotted on the horizontal axis and the lower limit modulation factor is plotted on the vertical axis. A boundary line M1 indicated by a solid line indicates the lower limit modulation factor that changes according to the carrier wave frequency. The lower limit modulation factor is a function of the "minimum pulse width [s]" and the "carrier wave frequency [Hz]" and can be represented as indicated by the following Expression.

$$\text{Lower limit modulation factor} = (\pi/4) \times (1 - \text{minimum pulse width} \times \text{carrier frequency} \times 2) \quad (7)$$

FIG. 14 indicates that, for example, "approximately 0.7" is the lower limit modulation factor when the carrier wave frequency is 3000 Hz and "approximately 0.6" is the lower limit modulation factor when the carrier wave frequency is 6000 Hz (the minimum ON width is 0.2 [μs]). The lower limit modulation factor decreases as the carrier wave frequency increases. However, the over-modulation mode does not always need to be started at a point on the lower limit modulation factor M1. The over-modulation mode only has to be started from any point where the modulation factor is equal to or higher than the lower limit modulation factor and lower than π/4 taking into account a permissible narrow pulse.

Therefore, in this embodiment, the power converter is operated in the asynchronous mode up to the lower limit modulation factor. After the modulation mode is switched to the synchronous multi-pulse mode (the synchronous twenty-seven pulse mode), the over-modulation mode is started from the second mode switching modulation factor PMF2 while the modulation factor is equal to or higher than the lower limit modulation factor and lower than π/4. However, when it is desired to more surely suppress the occurrence of the narrow pulse, the over-modulation mode can be started from when the modulation factor is equal to the lower limit modulation factor. On the other hand, in a low-speed region where the modulation factor is equal to or lower than the lower limit modulation factor, it is desirable to apply the asynchronous mode in which the switching frequency is high, a harmonic loss of the AC load can be reduced, and complicated control is unnecessary. Therefore, in this embodiment, the asynchronous mode is applied until the modulation factor is equal to the lower limit modulation factor to extend a region of the asynchronous mode as much as possible.

In the conventional power converter, the over-modulation mode is applied when the modulation factor is equal to or higher than π/4. Therefore, as it is seen from the lower limit modulation factor shown in FIG. 14, the narrow pulse sometimes occurs even when the modulation factor is lower than π/4. Stable switching operation cannot be realized unless the minimum ON function is not provided in the control unit. If the minimum ON function is provided, an error occurs between a pulse width output as a command value and an ON time in which the power converter actually operates. Therefore, it is likely that vibration occurs in an output voltage and induction failures are caused.

On the other hand, in the power converter according to this embodiment, the over-modulation mode is started from any point where the modulation factor is equal to or higher than the lower limit modulation factor and lower than π/4. Therefore, it is possible to suppress the occurrence of the narrow pulse. As it is evident from this, the essence of the present invention compared with the conventional technology is considered to reside in the application of the over-modulation mode in the region where the modulation factor is lower than π/4. According to this control, the power converter in the first embodiment achieves a conspicuous effect not achieved by the conventional technology that it is possible to suppress vibration of the output voltage due to the narrow pulse and suppress occurrence of induction failures.

The preferred embodiments according to the power converter of the present invention are explained above. However, a part of the configuration explained above can be omitted or changed and a part of the control operation explained above can be omitted or changed in a range not departing from the gist of the present invention explained below.

A first gist of the present invention resides in that, from a point in time when the modulation factor is lower than π/4, for a first period (a period in which the output voltage command is positive in the specific phase section) that is a period in which the fundamental wave of the AC output voltage applied to the AC load 1 by the power converter 2 is positive, the first period including a positive peak value of the AC output voltage, generating the modulated wave having a value always larger than a value of the carrier wave and generating a pulse waveform according to comparison of the modulated wave and the carrier wave. Note that the "period in which the fundamental wave is positive" can be read as a "period in which the fundamental wave is negative", "the positive peak value" can be read as a "negative peak value", "the value always larger" can be read as "a value always smaller", and the "first period" can be read as a "second period". The "AC output voltage" can be read as an "output voltage command". According to this operation, it is possible to suppress the occurrence of the narrow pulse even in a region where the modulation factor is lower than π/4 that is not taken into account in the conventional over-modulation mode.

Note that the first period is different depending on the modulation mode. In this embodiment, an example is explained in which, for example, during the over-modulation synchronous seventeen pulse mode, a range of ±5π/27 (=π/2−17π/54) centering on π/2 (90°), that is, a range of a value equal to or larger than 17π/54 and smaller than 37π/54 (=π/2+5π/27) is set as the first period. Note that it goes without saying that a range of ±5π/27 centering on 3π/2

(270°), that is, a range of a value equal to or larger than 71π/54 (=3π/2−5π/27) and smaller than 91 π/54 (=3n/2+5π/27) also corresponds to the first period.

A second gist of the present invention resides in, in a third period (the switching period explained above) that is a period other than the first period and the second period, correcting the value of the modulated wave such that the absolute value of the output voltage decreases. This takes into account the fact that the absolute value of an actual output voltage increases with respect to the output voltage command when the occurrence of the narrow pulse is suppressed in the first period. Note that the "period in which the fundamental wave is positive" can be read as a "period in which the fundamental wave is negative" and the "small value" can be read as a "large value". According to this operation, it is possible to suppress an error of an output voltage involved in the application of the over-modulation mode and improve accuracy of the output voltage.

Note that the third period is different depending on the modulation mode. In this embodiment, for example, during the over-modulation synchronous thirteen pulse mode, a range of a value equal to or larger than 0 (0°) and smaller than 13π/54, a range of a value equal to or larger than 41π/54 (=π−13π/54) and smaller than 67π/54 (=n+13π/54), or a range of a value equal to or larger than 95π/54 (=2π−13π/54) and smaller than 2π corresponds to the third period.

A third gist of the present invention resides in, as the amplitude (or the modulation factor) of the output voltage command increases, increasing the specific phase section in which the switching is stopped, that is, a ratio of the first period and the second period in one cycle of the AC output voltage stepwise, in other words, nonlinearly and discontinuously. According to this operation, irrespective of a start point in time of the over-modulation mode, it is possible to suppress the occurrence of the narrow pulse even in a transient change in which the modulation factor and the output frequency increase.

A fourth gist of the present invention resides in, as the amplitude of the output voltage command increases or decreases, increasing a correction value in the third period (the switching period) stepwise, in other words, nonlinearly and discontinuously so that the absolute value of the output voltage decreases. Note that it is desirable that control by the fourth gist is switched simultaneously with the control by the third gist.

A fifth gist of the present invention resides in setting the first period such that, when a pulse of a first carrier wave at the time when the output voltage command is positive is negative, the number of peak values of the carrier wave included in the first period is an odd number and, when the pulse of the first carrier wave at the time when the output voltage command becomes positive is positive, the number of peak values of the carrier wave included in the first period is an even number. According to this control, it is possible to maintain symmetry of the positive and the negative and the left and the right in the over-modulation mode and suppress imbalance of the output voltage.

Further, in the invention including the first gist, if timing for starting the over-modulation mode is set at a point in time when the modulated factor has a value equal to or smaller than the lower limit modulation factor, it is possible to maintain an ON state where ON operation of all the switching elements last for a period longer than the minimum ON time. Therefore, even when the modulation factor is lower than π/4, it is possible to completely suppress the occurrence of the narrow pulse.

Note that the power converter including the minimum ON function can suppress the occurrence of the narrow pulse. However, when the power converter includes the minimum ON function, an error of the output voltage occurs because an error occurs between an ON command based on the voltage command value and an actual ON time. Therefore, according to the present invention, there is an effect that even a power converter not including the minimum ON function can suppress the occurrence of the narrow pulse, and it is possible to suppress the error of the output voltage even if the present invention is applied to the power converter including the minimum ON function. Therefore, it is desirable to apply the present invention irrespective of presence or absence of the minimum ON function.

Note that the content of the gist of the present invention is different from a control method called two-phase modulation. The two-phase modulation is a technology for providing a period in which switching is halted at every 60° of the U, V, and W phases using a characteristic of a three-phase AC voltage in which a line-to-line voltage is invariable even if a voltage signal common to the three phases is applied to phase voltages. In the two-phase modulation, switching operation is always halted in any one of the phases in one cycle of an AC output voltage. However, in the present invention, it is not always necessary to halt the switching operation in any one of the phases. More specifically, when a relation of "Nover/Nca=2/3" is satisfied in Expression (4) described above, although the switching halt period in the two-phase modulation and the specific phase section of the present invention coincide, the two-phase modulation does not change the switching halt period according to a modulation factor unlike the present invention.

Second Embodiment

In a second embodiment, a vehicle driving system applied with the power converter explained in the first embodiment is explained.

Figure 15:
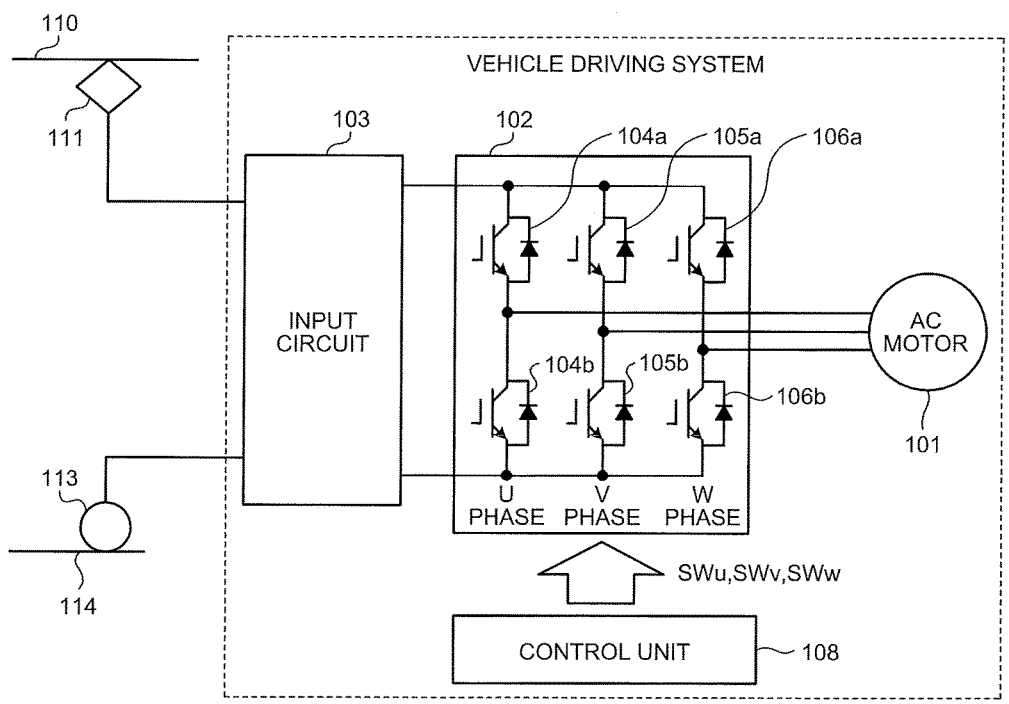
FIG. 15 is a diagram showing a configuration example of a vehicle driving system in which the power converter according to the first embodiment is applied to a railroad vehicle.

FIG. 15 is a diagram showing a configuration example of a vehicle driving system in which the power converter according to the first embodiment is applied to a railroad vehicle. The vehicle driving system according to the second embodiment includes an AC motor 101, a power converting unit 102, an input circuit 103, and a control unit 108. The AC motor 101 corresponds to the AC load 1 shown in FIG. 1 and is mounted on the railroad vehicle. The power converting unit 102 is the same as the power converting unit 2 shown in FIG. 1 and includes switching elements 104a, 105a, 106a, 104b, 105b, and 106b. The power converting unit 102 converts a DC voltage supplied from the input circuit 103 into an AC voltage having any frequency and any voltage and drives the AC motor 101. The control unit 108 is equivalent to the power converter explained in the first embodiment. That is, the control unit 108 includes the switching-signal generating unit 4 and the modulation-factor computing unit 8 explained in the first embodiment. The control unit 108 generates the switching signals SWu, SWv, and SWw for controlling the power converting unit 102.

Although not shown in the figure, the input circuit 103 includes a switch, a filter capacitor, and a filter reactor. One end of the input circuit 103 is connected to an overhead wire 110 via a current collector 111. The other end is connected to a rail 114, which is ground potential, via a wheel 113. The input circuit 103 receives supply of DC power or AC power from the overhead wire 110 and generates DC power supplied to the power converting unit 102.

By applying the power converter in the first embodiment to the vehicle driving system in this way, it is possible to supply a stable voltage without voltage vibration and the like to the AC motor 101. Therefore, it is possible to suppress induction failures and realize stable vehicle control.

Third Embodiment

In a third embodiment, a configuration in which 3n-th order (n is a positive integer) harmonics of a fundamental wave is superimposed on a modulated wave is explained. This embodiment is different from the first embodiment in a calculation method for a modulated wave, a start point in time of over-modulation mode, and a lower limit modulation factor of the over-modulation mode. Therefore, the differences are explained below.

In this embodiment, third-order harmonics is superimposed on a fundamental wave of a modulated wave as 3n-th order harmonics. Therefore, the modulated-wave computing unit 69 generates, using the modulated wave phase angles $\theta u$, $\theta v$, and $\theta w$ and the narrow pulse avoidance modulation factors Au, Av, and Aw, according to the following expression, the modulated waves (hereinafter referred to as "third-order superimposed modulated waves" according to necessity) $\alpha u$, $\alpha v$, and $\alpha w$ on which third-order harmonic components of the fundamental wave are superimposed. It is known that a maximum output voltage is improved by superimposing the 3n-th order harmonics of the fundamental wave on the modulated wave in this way. This is hereinafter referred to as "third-order superimposition control". When the third-order superimposition control is applied, the 3n-th order harmonics are included in output voltages output to the phases. However, in a three-phase AC load, third-order harmonics including in a line-to-line voltage is cancelled. Only an advantage of the improvement of the maximum output voltage can be enjoyed.

$$\alpha u = Au \times \{\sin(\theta u) + (1/6) \times \sin(3\theta u)\}$$

$$\alpha v = Av \times \{\sin(\theta v) + (1/6) \times \sin(3\theta v)\}$$

$$\alpha w = Aw \times \{\sin(\theta w) + (1/6) \times \sin(3\theta w)\} \quad (8)$$

As explained above, in the conventional over-modulation mode, the over-modulation mode is started by gradually increasing the maximum amplitude value of the modulated wave, which is the fundamental wave of the output voltage command, according to the output voltage command. Therefore, the start of the over-modulation mode is from the point in time of the modulation factor $\pi/4$ at which the maximum amplitude of the modulated wave and the maximum value of the carrier wave coincide. On the other hand, when the third-order superimposition control is applied, the maximum amplitude of the modulated wave coincides with the maximum value of the carrier wave at a point in time when the modulation factor is $\pi/\sqrt{(12)}$. Therefore, the start of the conventional over-modulation mode is the point in time when the modulation factor is $\pi/\sqrt{(12)}$. However, as in the case in which the third-order superimposition control is not applied, it is likely that the narrow pulse occurs even when the modulation factor at which the maximum amplitude of the modulated wave coincides with the maximum value of the carrier wave is lower than $\pi/\sqrt{(12)}$. Therefore, when the third-order superimposition control of the fundamental wave is applied to the modulated wave, it is important to start the over-modulation mode from a point in time when the modulation factor is lower than $\pi/\sqrt{(12)}$ by setting the second mode switching modulation factor PMF2 for determining the start of the over-modulation mode to a value smaller than $\pi/\sqrt{(12)}$.

Figure 16:
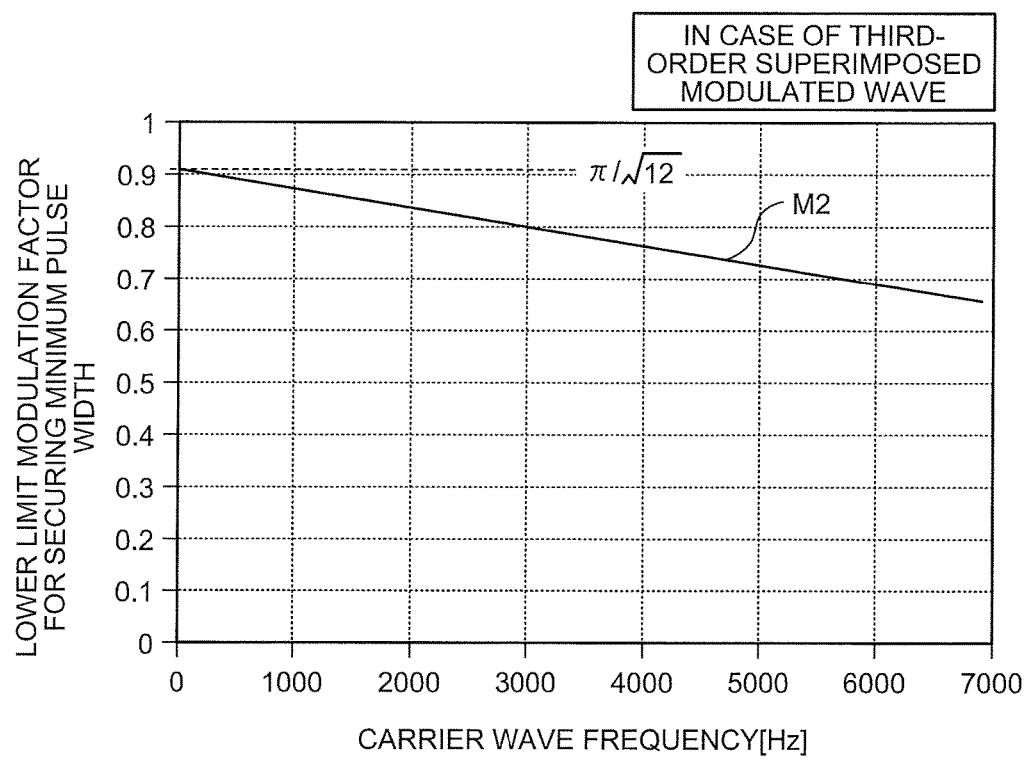
FIG. 16 is a diagram showing a relation between a lower limit modulation factor for securing a minimum pulse width and a carrier wave frequency in a third embodiment.

Further, when the third-order superimposition control is applied, the lower limit modulation factor for determining the start of the over-modulation mode is also different. FIG. 16 is a diagram showing the lower limit modulation factor for securing the minimum pulse width in the case of a third-order superimposition modulated wave. In FIG. 16, the carrier wave frequency is plotted on the horizontal axis and the lower limit modulation factor is plotted on the vertical axis. A boundary line M2 indicated by a solid line indicates the lower limit modulation factor that changes according to the carrier wave frequency. However, the boundary line M2 is different from a boundary line at the time when the third-order superimposition control is not applied. In the case of the third-order superimposition control, the lower limit modulation factor is a function of the "minimum pulse width" and the "carrier wave frequency" and can be represented as indicated by the following expression.

Lower limit modulation factor=$(\pi/\sqrt{(12)}) \times (1-\text{minimum pulse width} \times \text{carrier wave frequency} \times 2)$ (9)

Therefore, in this embodiment, the over-modulation mode is started from a point in time when the modulation factor is equal to or higher than the lower limit modulation factor indicated by Expression (9) and lower than $\pi/\sqrt{(12)}$.

The modulation mode according to this embodiment is summarized as explained below. When the modulation factor PMF is equal to or higher than 0 and lower than the first mode switching modulation factor PMF1, the modulation mode is the asynchronous mode in which the third-order superimposition control is applied. When the modulation factor is equal to or higher than the first mode switching modulation factor PMF1 and lower than the second mode switching modulation factor PMF2, the modulation mode is the synchronous multi-pulse mode (e.g., the synchronous twenty-seven pulse mode). When the modulation factor is equal to or higher than the second mode switching modulation factor PMF2, the modulation mode is the over-modulation mode same as the over-modulation mode in the first embodiment. When the modulation factor is 100%, the modulation mode is the synchronous one pulse mode.

Because the third-order superimposition control is applied in this embodiment, the asynchronous mode and the synchronous multi-pulse mode can be extended to the modulation factor $\pi/\sqrt{(12)}$ at which a maximum value of the modulated wave superimposed with the third-order harmonics and a maximum value of the carrier wave coincide. Therefore, the first mode switching modulation factor PMF1 is desirably set to a value equal to or larger than $\pi/4$ and smaller than $\pi/\sqrt{(12)}$, for example, the modulation factor 0.8 and more desirably set to an intersection of the control curve (the modulation factor/frequency characteristic) L1 during the VVVF control shown in FIG. 2 and the lower limit modulation factor calculated by Expression (9). Consequently, it is possible to extend the asynchronous mode as much as possible while suppressing the occurrence of the narrow pulse.

Further, as in the first embodiment, the synchronous multi-pulse mode applied between the first mode switching modulation factor PMF1 and the second mode switching modulation factor PMF2 can be omitted. The over-modulation mode can be applied from a point in time when the modulation factor is equal to or higher than the first mode switching modulation factor PMF1. In such a case, if the first mode switching modulation factor PMF1 is set as explained above, the over-modulation mode is started from the point in time when the modulation factor is equal to or higher than the lower limit modulation factor and lower than $\pi/\sqrt{(12)}$. Therefore, it is possible to suppress the occurrence of the narrow pulse even when the modulation factor is lower than $\pi/\sqrt{(12)}$ not taken into account in the past.

Note that, as explained above, the third-order superimposition control can improve the maximum output voltage from the modulation factor $\pi/4$ to the modulation factor $\pi/\sqrt{(12)}$. However, in the over-modulation mode, a voltage equal to or higher than the modulation factor $\pi/4$ can be output even if the third-order superimposition control is not applied. Therefore, the third-order superimposition control does not have to be applied in the over-modulation mode. According to this control, it is possible to suppress the generation of the modulated wave in the over-modulation mode from being complicated more than necessary.

A calculation method for the modulated wave in the third-order superimposition control is not limited to the operational expression of Expression (8) for superimposing the third-order harmonics. In the three-phase power converter, harmonics can be included in output voltages to the phases if harmonics are not included in the line-to-line voltage output by the power converting unit. According to this control, the waveform of the modulated wave has flexibility. The modulated wave can be the modulated wave superimposed with the third-order harmonic component of the fundamental wave as explained above or can be a modulated wave superimposed with a plurality of 3n-th order harmonic components of the fundamental wave. Further, the harmonics to be superimposed is not limited to the sine wave. For example, a triangular wave can be used.

Subsequently, a material of the switching elements included in the power converting unit in the first to third embodiments is explained. In general, a switching element used in a power converter is a switching element in which a semiconductor transistor element (IGBT, MOSFET, etc.) including silicon (Si) as a material and a semiconductor diode element including silicon as a material are connected in anti-parallel. The technology explained in the first to third embodiments can be used in the power converter including the general switching element.

On the other hand, the technology in the first to third embodiments is not limited to the switching element formed using the silicon as the material. It is naturally possible to use, in the power converter, a switching element consisting of a wide-band gap semiconductor such as silicon carbide (SiC), which attracts attention in recent years as a low-loss and high-pressure resistant semiconductor element, instead of the silicon.

The silicon carbide, which is a kind of the wide-band gap semiconductor, has a characteristic that, compared with the silicon, the silicon carbide can greatly reduce a loss that occurs in the semiconductor element and can be used at high temperature. Therefore, if the switching element including the silicon carbide as the material is used as the switching elements included in the power converting unit, it is possible to raise an allowable working temperature of the switching element module to a high-temperature side. Therefore, it is possible to increase the carrier wave frequency and improve the operation efficiency of the AC load. However, when the carrier wave frequency is increased, there is the problem of induction failures due to the occurrence of the narrow pulse explained above. Therefore, it is difficult to perform control for simply increasing the carrier wave frequency without taking measures for solving the problem.

As explained above, with the technology according to the first to third embodiments, in the power converter that performs the PWM control, even if the switching speed is increased using the switching element including the silicon carbide as the material, it is possible to suppress the occurrence of the narrow pulse. Therefore, it is possible to improve the operation efficiency of the AC load while suppressing the occurrence of induction failures.

Note that the silicon carbide (SiC) is an example of a semiconductor called wide-band gap semiconductor in view of a characteristic that a band gap is larger than a band gap of the silicon (Si). Besides the silicon carbide, for example, a semiconductor formed using a gallium nitride material or diamond also belongs to the wide-band gap semiconductor. Characteristics of the materials are similar to the characteristic of the silicon carbide in many points. Therefore, a configuration in which the wide-band gap semiconductor other than the silicon carbide is used also forms the gist of the present invention.

Note that the configurations explained in the first to third embodiments indicate an example of the contents of the present invention. It is possible to combine the configurations with another publicly-known technology. It is possible to omit or change a part of the configurations in a range not departing from the gist of the present invention.

REFERENCE SIGNS LIST

1 AC load
2 power converting unit
3 DC power source
4 switching-signal generating unit
5 carrier-wave generating unit
6 modulated-wave generating unit
7 comparing unit
8 modulation-factor computing unit
10 voltage detecting unit
20 control unit
61 mode selecting unit
62 correction-coefficient table group
63 correction-coefficient selecting unit
64 phase-condition table group
65 specific-phase selecting unit
66 three-phase generating unit
67 multiplier
68 modulation-factor selecting unit
69 modulated-wave computing unit
101 AC motor
102 power converting unit
104a, 105a, 106a, 104b, 105b, 106b switching element
103 input circuit
108 control unit
110 overhead wire
111 current collector
113 wheel
114 rail
611, 612, 613, 614, 682 comparison determiner
615, 616, 617 adder
631 modulation-factor-correction-coefficient storing unit
651 specific-phase storing unit
681 phase converting unit
683 modulated-wave-amplitude switching unit

The invention claimed is:
1. A power converter comprising:
a power converting unit including a switching element, the power converting unit converting DC power into AC power; and a control unit including a modulated-wave generating unit to generate a modulated wave synchronized with an output voltage command of the power converting unit and a carrier-wave generating unit to output a carrier wave having a frequency higher than a frequency of the modulated wave, the control unit controlling the power converting unit by comparing the modulated wave and the carrier wave to output a switching signal for driving the switching element, wherein when a modulation factor in converting the DC power into the AC power is equal to or higher than a mode switching modulation factor and is lower than $\pi/4$, the power converting unit converts the DC power into the AC power in an over-modulation mode, in which switching of the switching element is stopped for a period longer than one cycle of the carrier wave and a ratio of the first period in one cycle of the AC output voltage increases as the modulation factor increases, in a first period in which an AC output voltage is positive and timing of a positive peak value of the AC output voltage is included.

2. The power converter according to claim 1, wherein, in the over-modulation mode, the power converting unit causes the switching of the switching element to be stopped for a period longer than one cycle of the carrier wave in a second period in which the output voltage command is negative and timing of a negative peak value of the output voltage command is included.

3. The power converter according to claim 1, wherein the power converting unit increases a ratio of the first period in one cycle of an AC output voltage stepwise as the modulation factor increases in the over-modulation mode.

4. The power converter according to claim 1, wherein the modulated-wave generating unit includes:
a mode selecting unit to generate a mode selection code for identifying a PWM mode on the basis of the modulation factor; and
a correction-coefficient selecting unit to store a correction coefficient corresponding to the PWM mode, and select a correction coefficient corresponding to the mode selection code, and
the modulated-wave generating unit corrects the modulation factor according to the correction coefficient selected by the correction-coefficient selecting unit to correct a value of the modulated wave.

5. The power converter according to claim 1, wherein the modulated-wave generating unit includes:
a mode selecting unit to generate a mode selection code for identifying a PWM mode on the basis of the modulation factor; and
a specific-phase selecting unit to store a specific phase corresponding to the PWM mode therein and select a specific phase corresponding to the mode selection code, and
the modulated-wave generating unit generates the modulated wave according to the specific phase selected by the specific-phase selecting unit.

6. The power converter according to claim 1, wherein the carrier wave is synchronized with the modulated wave.

7. The power converter according to claim 1, wherein a modulated wave generated by the modulated wave and the carrier wave is a three-phase modulated wave.

8. The power converter according to claim 1, wherein the mode switching modulation factor is equal to or higher than a lower limit modulation factor determined by a minimum pulse width of the switching element and a frequency of the carrier wave.

9. The power converter according to claim 1, wherein the switching element included in the power converting unit is formed by a wide-band gap semiconductor.

10. A vehicle driving system comprising:
the power converter according to claim 1;
an input circuit to generate input power to the power converter; and
an electric motor driven by the power converter.

11. A power converter comprising:
a power converting unit including a switching element, the power converting unit converting DC power into AC power; and
a control unit including a modulated-wave generating unit to generate a modulated wave synchronized with an output voltage command of the power converting unit and a carrier-wave generating unit to output a carrier wave having a frequency higher than a frequency of the modulated wave, the control unit controlling the power converting unit by comparing the modulated wave and the carrier wave to output a switching signal for driving the switching element, wherein when a modulation factor in converting the DC power into the AC power is lower than a mode switching modulation factor and is lower than $\pi/\sqrt{(12)}$, the power converting unit outputs an AC voltage superimposed with 3n-th (n is a positive integer) order harmonics, and when the modulation factor is equal to or higher than the mode switching modulation factor, the power converting unit converts the DC power into the AC power in an over-modulation mode, in which switching of the switching element is stopped for a period longer than one cycle of the carrier wave and a ratio of the first period in one cycle of the AC output voltage increases as the modulation factor increases, in a first period in which an AC output voltage is positive and timing of a positive peak value of AC the output voltage is included.

12. The power converter according to claim 11, wherein, in the over-modulation mode, the power converting unit causes the switching of the switching element to be stopped for a period longer than one cycle of the carrier wave in a second period in which the output voltage command is negative and timing of a negative peak value of the output voltage command is included.

13. The power converter according to claim 11, wherein the power converting unit increases a ratio of the first period in one cycle of an AC output voltage stepwise as the modulation factor increases in the over-modulation mode.

14. The power converter according to claim 11, wherein the modulated-wave generating unit includes:
a mode selecting unit to generate a mode selection code for identifying a PWM mode on the basis of the modulation factor; and
a correction-coefficient selecting unit to store a correction coefficient corresponding to the PWM mode, and select a correction coefficient corresponding to the mode selection code, and
the modulated-wave generating unit corrects the modulation factor according to the correction coefficient selected by the correction-coefficient selecting unit to correct a value of the modulated wave.

15. The power converter according to claim 11, wherein the modulated-wave generating unit includes:
a mode selecting unit to generate a mode selection code for identifying a PWM mode on the basis of the modulation factor; and a specific-phase selecting unit to store a specific phase corresponding to the PWM mode therein and select a specific phase corresponding to the mode selection code, and the modulated-wave generating unit generates the modulated wave according to the specific phase selected by the specific-phase selecting unit.

16. The power converter according to claim 11, wherein the carrier wave is synchronized with the modulated wave.

17. The power converter according to claim 11, wherein a modulated wave generated by the modulated wave and the carrier wave is a three-phase modulated wave.

18. The power converter according to claim 11, wherein the mode switching modulation factor is equal to or higher than a lower limit modulation factor determined by a minimum pulse width of the switching element and a frequency of the carrier wave.

19. The power converter according to claim 11, wherein the switching element included in the power converting unit is formed by a wide-band gap semiconductor.

20. A vehicle driving system comprising:
the power converter according to claim 11;
an input circuit to generate input power to the power converter; and
an electric motor driven by the power converter.

* * * * *